United States Patent [19]

Moser et al.

[11] 4,256,627

[45] Mar. 17, 1981

[54] NOVEL LIGHT STABILIZERS FOR PLASTICS

[75] Inventors: Paul Moser, Riehen; Jean Rody, Basel; Friedrich Karrer, Zofingen, all of Switzerland

[73] Assignee: Ciba-Geigy Corporation, Ardsley, N.Y.

[21] Appl. No.: 956,716

[22] Filed: Nov. 1, 1978

[30] Foreign Application Priority Data

Nov. 8, 1977 [CH] Switzerland ................ 13587/77

[51] Int. Cl.³ .................... C08K 5/34; C08K 5/35; C08K 5/09
[52] U.S. Cl. ............... 260/45.75 N; 260/45.75 M; 260/45.8 N; 260/45.8 NT; 260/45.8 NZ; 260/23 R; 260/22 A; 260/18 TN
[58] Field of Search ............ 260/45.8 N, 45.8 NP, 260/45.75; 252/400

[56] References Cited

U.S. PATENT DOCUMENTS

| | | | |
|---|---|---|---|
| 3,464,943 | 9/1969 | Newland et al. | 260/23 H |
| 3,464,953 | 9/1969 | Newland | 260/45.75 N |
| 4,086,204 | 4/1978 | Cassandrini et al. | 260/45.8 NT |
| 4,086,207 | 4/1978 | Cassandrini et al. | 260/45.8 N |
| 4,096,114 | 6/1978 | Minagawa et al. | 260/45.8 NZ |
| 4,104,248 | 8/1978 | Cantatore | 260/45.8 N |

FOREIGN PATENT DOCUMENTS 2040983 3/1971 Fed. Rep. of Germany.
2719131 12/1977 Fed. Rep. of Germany.

OTHER PUBLICATIONS

Heller et al., "Pure and Applied Chemistry", 36, 1973, pp. 141–161.
H. Lind, Kunststoffe 69, 1979.
J. Polymer Science–vol. 12, 2217–2233, (1974), Carlsson et al.

*Primary Examiner*—V. P. Hoke
*Attorney, Agent, or Firm*—Wenderoth, Lind & Ponack

[57] ABSTRACT

Mixtures of a polymer which contains polyalkylpiperidines chemically bonded in any form and a metal compound $MeL_w$, in which Me is a divalent or trivalent metal ion or a divalent oxo-metal ion or a divalent dialkyl-tin ion, L is the monovalent anion of a carboxylic acid, of a phosphinic acid or of a phosphonic acid monoester or of an enol and w is 2 or 3, are effective light stabilizers for plastics. The piperidine-containing polymers can be, for example, polyesters, polyamides, polyamines, polyaminotriazines or poly(meth)-acrylates. Examples of metal compounds $MeL_w$ are nickel oenanthate or nickel acetylacetonate. Plastics to be stabilized are in particular the polyolefins.

23 Claims, No Drawings

NOVEL LIGHT STABILIZERS FOR PLASTICS

The invention relates to novel mixtures of polymeric polyalkylpiperidine compounds and metal compounds, which are suitable for stabilising plastics, in particular against light degradation. It is known that derivatives of polyalkylpiperidines are outstanding light stabilisers for plastics. Sterically hindered piperidines of this type are used to an increasing extent, in particular for stabilising polyolefins. Examples of such piperidine compounds are the esters of 4-hydroxy-polyalkylpiperidines described in German Offenlegungsschrift No. 2,204,659 or the N-acyl derivatives of 4-amino-polyalkylpiperidines described in German Offenlegungsschrift No. 2,040,975.

It is also already known from German Offenlegungsschrift No. 2,625,967 that the effectiveness of polyalkylpiperidine stabilisers can be increased by forming a complex with divalent or trivalent metal ions. For this purpose, a polyalkylpiperidine compound is reacted with a metal compound of the formula $MeL_w$, in which Me is a metal of valency w and L is a monovalent anion of an aliphatic carboxylic acid, of an aminophosphonic or aminophosphinic acid or of an enol. A further advantage of the complexing of piperidine stabilisers according to German Offenlegungsschrift No. 2,625,967 is that the stability to extraction is increased and the protective action is prolonged. However, these two properties are still inadequate for certain applications. Especially when the plastic is present in thin layers, as in lacquers, films and fibres, an even higher fastness to extraction and migration is required.

It has now been found that a further increase in the fastness to extraction and migration can be achieved when polymeric polyalkylpiperidine compounds are mixed with specific metal compounds.

The invention therefore relates to mixtures of (a) a polymer which contains polyalkylpiperidine residues chemically bonded in any form and (b) a metal compound of the formula $MeL_w$, in which Me is a divalent or trivalent metal ion or a divalent oxo-metal ion or a divalent dialkyl-tin ion, L is the monovalent anion of a carboxylic acid, of a phosphinic acid or of a phosphonic acid monoester, each of which can be substituted by hydroxyl, amino groups or polyalkylpiperidine groups, or is an enolate ion of the formula VI

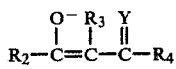

in which Y is oxo or substituted or unsubstituted imino, $R_2$ is alkyl, alkenyl, cycloalkyl, aralkyl, aryl or substituted aryl and $R_3$ is hydrogen, alkyl, alkenyl, cycloalkyl, aralkyl, aryl, alkoxycarbonyl or alkoxycarbonylalkyl, or $R_2$ and $R_3$ together are substituted or unsubstituted 1,4-buta-1,3-dienylene or 1,4-butylene, or $R_2$ and $R_3$ together are a group of the formula VIa

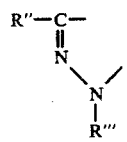

in which R" is alkyl, phenyl or substituted phenyl and R''' is phenyl or alkylphenyl, and $R_4$ is alkyl, alkenyl, cycloalkyl, aryl, aralkyl, alkoxy, a primary, secondary or tertiary amino group or a group —O—Pi or —NR$_5$—Pi, in which $R_5$ is hydrogen, alkyl, cycloalkyl or aralkyl and Pi is a polyalkylpiperidine radical, and in which $R_2$, $R_3$ or $R_4$ can also be alkyl which is substituted by a residue of the formulae —O—Pi, —NR$_5$—Pi, —COO—Pi or —CONR$_5$—Pi and w is 2 or 3, especially those mixtures of (a) and (b) in which component (a) consists of a polymer, the recurring structural unit of which contains at least one polyalkylpiperidine radical of the formula I or II

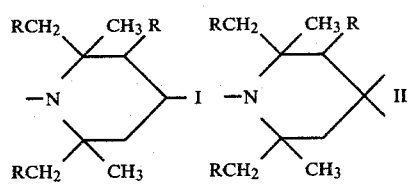

or is substituted by a polyalkylpiperidine side group of the formula III, IV or V

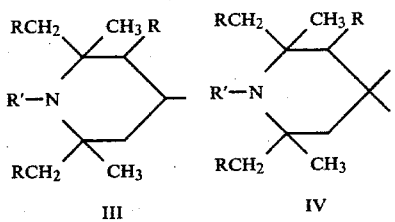

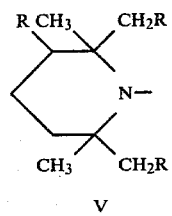

in which R is hydrogen or $C_1$-$C_5$ alkyl and R' is hydrogen, $C_1$-$C_{18}$ alkyl, $C_3$-$C_8$ alkenyl, $C_3$-$C_8$ alkynyl, $C_7$-$C_{12}$ aralkyl, $C_1$-$C_8$ alkanoyl or $C_3$-$C_5$ alkenoyl, or a copolymer thereof, and those mixtures in which component (b) is a metal compound of the formula $MeL_w$, in which the cation Me is one of the series $Mg^{2+}$, $Ca^{2+}$, $Sr^{2+}$, $Ba^{2+}$, $Zn^{2+}$, $Cd^{2+}$, $Sn^{2+}$, $Al^{3+}$, $Cr^{3+}$, $Ni^{2+}$, $Co^{2+}$, $Mn^{2+}$, $VO^{2+}$, $MoO^{2+}$ or $(C_1$-$C_{12}$ alkyl$)_2Sn^{2+}$ and in which the ligand L is the monovalent anion of an aliphatic, cycloaliphatic, araliphatic or aromatic carboxylic acid, of a phosphinic acid or of a phosphonic acid monoester, each of which has 2–22 C atoms and is unsubstituted or substituted by —OH, —NH$_2$, —NHR$_5$, —NR$_5$R$_6$ or a residue of the formula —Pip, —O—Pip, —NR$_5$—Pip, —COOPip or —CONR$_5$—Pip, in which $R_5$ is hydrogen, $C_1$-$C_{12}$ alkyl, cyclohexyl or benzyl and $R_6$ is $C_1$-$C_{12}$ alkyl, cyclohexyl, benzyl, $C_6$-$C_{10}$ aryl or $C_7$-$C_{12}$ alkylphenyl, or in which $R_5$ and $R_6$ together are 1,4-butylene, 1,5-pentylene or 3-oxa-1,5-pentylene, and in which Pip is a residue of the formulae III or Va

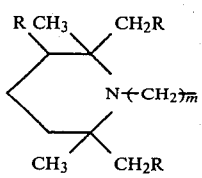

Va in which m is 1, 2 or 3, or L is an enolate ion of the formula VI

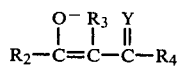

VI in which Y is oxo or an imino group =NH or =NR$_6$, R$_2$ is C$_1$–C$_{12}$ alkyl, C$_3$–C$_6$ alkenyl, C$_5$–C$_{12}$ cycloalkyl, C$_7$–C$_{12}$ aralkyl, C$_6$–C$_{10}$ aryl or phenyl which is substituted by C$_1$–C$_4$ alkyl, hydroxyl or halogen and R$_3$ is hydrogen, C$_1$–C$_{12}$ alkyl, C$_3$–C$_6$ alkenyl, C$_5$–C$_{12}$ cycloalkyl, C$_7$–C$_{12}$ aralkyl, phenyl, C$_2$–C$_{13}$ alkoxycarbonyl or C$_3$–C$_{14}$ alkoxycarbonylmethyl, or R$_2$ and R$_3$ together are a 1,4-buta-1,3-dienylene or 1,4-butylene radical which is unsubstituted or substituted by C$_1$–C$_4$ alkyl or halogen, or R$_2$ and R$_3$ together are a group of the formula VIa

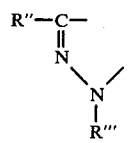

VIa in which R'' is C$_1$–C$_6$ alkyl, phenyl or phenyl substituted by C$_1$–C$_8$ alkyl and/or hydroxyl and R''' is phenyl or phenyl substituted by C$_1$–C$_4$ alkyl, and R$_4$ is C$_1$–C$_{12}$ alkyl, C$_3$–C$_6$ alkenyl, C$_5$–C$_{12}$ cycloalkyl, C$_7$–C$_{12}$ aralkyl, phenyl, C$_1$–C$_{12}$ alkoxy or a group of the formulae —NH$_2$, —NHR$_6$, —NR$_5$R$_6$, —O—Pip or —NR$_5$—Pip and in which R$_2$, R$_3$ or R$_4$ can also be C$_1$–C$_4$ alkyl which is substituted by a residue of the formula —O—Pip, —NR$_5$—Pip, —COO—Pip or —CONR$_5$—Pip, and w is 2 or 3.

The weight ratio of (a) to (b) in the mixtures is 99.9:0.1 to 10:90 and preferably 95:5 to 60:40.

Thus, according to the invention component (a) in every case contains polyalkylpiperidine groups whilst component (b) may or may not contain such groups.

The polymers of component (a) are those such as are obtainable by polycondensation, polyaddition or polymerisation of suitable derivatives of polyalkylpiperidines. Examples of such polymers are polyesters, polyamides, polyurethanes, polyureas, polycarbonates, polyethers, polyamines, polysulphides, polysulphones, polyimides, polysulphonates, polyphosphates, polyphosphonates, polysilyl esters, polysiloxanes, polyhydrazides, polyhydrazones, polybenzimidazoles, triazine-containing polymers, polymers of styrene, of esters, amides or nitriles of unsaturated carboxylic acids, of vinyl or allyl esters and of vinylpyrrolidone or polymers of maleimides, which contain piperidine residues of the formula I to V.

The polymeric piperidine compounds of component (a) can also be copolymers in which two or more different polymer types are combined, for example polyester-amides, polyether-esters, polyether-amines, polyether-urethanes or polyether-sulphones. Component (a) can also be copolymers of the same polymer type, for example a polyester obtained from two different diols or from two different dicarboxylic acids. In these copolymers too each recurring structural unit contains at least one piperidine radical. Finally, the polymers can also be copolymers in which only one component contains a polyalkylpiperidine radical, for example the copolymer of a piperidine-containing acrylate with a piperidine-free acrylate. In this case the molar ratio of the piperidine-containing component to the piperidine-free component should be at least 1:10.

If these polymers have a low degree of polymerisation they are also termed oligomers. Such oligomeric piperidine compounds are very suitable as component (a) for the present invention. Compounds preferred as component (a) are polyesters, polyethers, polyureas, polyamides, polyurethanes, polyamines or polyaminotriazines, which contain polyalkylpiperidine radicals of the formulae I to V, and poly(meth)acrylates or poly(meth)acrylamides, which contain polyalkylpiperidine radicals of the formulae III to V.

The substituent R in formulae I to V can be C$_1$–C$_5$ alkyl, for example methyl, ethyl, propyl, butyl or pentyl. R is preferably hydrogen or methyl and particularly preferentially hydrogen. If R is hydrogen, the polyalkylpiperidine radicals I–V are radicals of 2,2,6,6-tetramethylpiperidine.

R' can be C$_1$–C$_{18}$ alkyl, for example methyl, ethyl, propyl, butyl, isopentyl, 2-ethylhexyl, decyl, dodecyl or octadecyl. R' can be alkenyl having 3–8 C atoms, for example allyl, methallyl or dimethallyl, or can be C$_3$–C$_8$ alkynyl, for example propargyl, but-4-ynyl or hept-4-ynyl. As C$_7$–C$_{12}$ aralkyl, R' can be, for example, benzyl, phenylethyl or phenylpropyl. As C$_1$–C$_8$ alkanoyl, R' can be, for example, formyl, acetyl, propionyl, butyroyl, valeroyl or capronyl and as C$_3$–C$_5$ alkenoyl R' can be, for example, acryloyl, methacryloyl or vinylacetyl. R' is preferably hydrogen or methyl.

Component (b) is a metal compound MeL$_w$, in which Me is a divalent or trivalent metal ion or oxo-metal ion, for example the divalent cation of Mg, Ca, Sr, Ba, Zn, Sn, Cd, Ni, Co, Mn, VO, MoO$_2$ or the trivalent cation of Al or Cr or a divalent dialkyl-tin cation, for example the divalent cation of diethyl-tin, dibutyl-tin, dihexyl-tin, dioctyl-tin or di-dodecyl-tin. Me is preferably a cation of the series Ni$^{2+}$, Co$^{2+}$, Zn$^{2+}$, Mg$^{2+}$, Ca$^{2+}$ and Al$^{3+}$ and particularly preferentially is the divalent cation of nickel or cobalt.

L can be the anion of a carboxylic acid which can be unsubstituted, for example acetic acid, propionic acid, butyric acid, caproic acid, caprylic acid, 2-ethylcaproic acid, lauric acid, stearic acid, eicosanoic acid, benzoic acid, naphthoic acid, toluic acid, phenylacetic acid, phenylbutyric acid, t-butylbenzoic acid, oleic acid or cinnamic acid, or can be substituted by hydroxyl, for example lactic acid, hydracrylic acid, salicylic acid, tropic acid, ricinoleic acid, hydroxystearic acid or 3,5-di-tert.-butyl-4-hydroxybenzoic acid, or can be substituted by an amino group, for example glycine, dibutylaminoacetic acid, alanine, β-dimethylaminopropionic acid, valine, isoleucine, p-dibutylamino-benzoic acid or cyclohexylamino-acetic acid, or can be substituted by a polyalkylpiperidine radical, for example 2,2,6,6-tetramethylpiperidin-4-yl-acetic acid, 1,2,2,6,6-pentamethylpiperidin-4-oxy-propionic acid, 4-amino-2,2,6,6-tetramethylpiperidine-4-carboxylic acid or 2,2,6,6-tetramethyl-piperidine-4-aminoacetic acid. The carboxylic acid can also be a mixture of natural or industrially produced carboxylic acids, for example coconut fatty acid, tallow fatty acid or naphthenic acid. L is preferably the anion of an aliphatic carboxylic acid. L can also be the anion of a phosphinic acid or of a phosphonic acid monoester, each of which can be unsubstituted, for example dihexylphosphinic acid, butylphenylphosphinic acid, dicyclohexylphosphinic acid, monoethyl hexylphosphonate, monomethyl octadecylphosphonate or monobutyl benzylphosphonate, or can be substituted by hydroxyl groups, for example monoethyl 2-hydroxy-2-phenyl-ethylphosphonate, α-hydroxybenzyl-phenylphosphinic acid or monobutyl 4-hydroxy-3,5-di-tert.-butyl-benzylphosphonate, or can be substituted by amino groups, for example monomethyl α-aminobenzylphosphonate, monohexyl diethylaminomethylphosphonate, monomethyl α-butylaminobenzylphosphonate, monobutyl α-morpholinomethyl-phosphonate, monoethyl α-dibutylamino-isopropylphosphonate, monomethyl α-cyclohexylamino-benzylphosphonate, α-anilino-benzyl-phenylphosphinic acid or diethylaminomethylphenyl-phosphinic acid, or can be substituted by a polyalkyl-piperidine group, for example monoethyl 1-(1,2,2,6,6-pentamethylpiperidinyl-4-amino)-heptylphosphonate or monoethyl 2-(2,2,6,6-tetramethylpiperidinyl-4-amino)-ethylphosphonate. Amongst the phosphonyl ligands, the anions of monoalkyl α- or β-aminophosphonates are preferred.

The ligand L can also be an enolate ion of the formula VI. Such an ion is an anion of a β-diketone, β-ketoester or β-ketoamide, of a o-hydroxyphenylcarbonyl compound or of a o-hydroxyphenyl-carboxylic acid ester or acid amide, or a monoimino derivative of such an anion.

$R_2$, $R_3$ and $R_4$ in formula VI can in this case be alkyl, for example methyl, ethyl, isopropyl, butyl, isoamyl, hexyl, 2-ethylhexyl, tert.-octyl, isodecyl or dodecyl, or can be alkenyl, for example allyl, methallyl or dimethallyl, or can be cycloalkyl, for example cyclopentyl, cyclohexyl, cyclooctyl or cyclododecyl, or can be aralkyl, for example benzyl or phenylethyl. $R_2$ can also be aryl, such as phenyl or naphthyl, or phenyl substituted by alkyl, hydroxyl and/or halogen, for example chlorophenyl, bromophenyl, dichlorophenyl, tolyl, p-tert.-butylphenyl, 4-hydroxyphenyl or 3,5-di-tert.-butyl-4-hydroxyphenyl. $R_3$ can also be alkoxycarbonyl or alkoxycarbonylmethyl, for example —COOCH$_3$, —COOC$_2$H$_5$ or —CH$_2$COOC$_4$H$_9$. $R_2$ and $R_3$ together can be a 1,4-butadienylene or 1,4-butylene radical which is unsubstituted or substituted by halogen, lower alkyl or lower alkoxy, and in this case they form, together with the two C atoms to which they are bonded, a benzene ring or cyclohexene ring.

$R_4$ can also be alkoxy, for example methoxy, ethoxy, isopropoxy, butoxy, hexyloxy, octyloxy or dodecyloxy.

$R_5$ and $R_6$ can be alkyl, for example methyl, ethyl, isopropyl, butyl, hexyl, tert.-octyl or dodecyl, or can be cycloalkyl, preferably cyclohexyl, or can be aralkyl, preferably benzyl. $R_6$ can also be aryl, for example phenyl, naphthyl or tolyl. $R_5$ and $R_6$ together can be 1,4-butylene, 1,5-pentylene or 3-oxa-1,5-pentylene, so that, together with the N atom to which they are bonded, they form a pyrrolidine, piperidine or morpholine ring.

$R_2$ and $R_3$ together can be a group of the formula VIa, so that, together with the C atom to which they are bonded, they form a pyrazole ring. The latter is substituted by the radicals R" and R'".

R" can be alkyl, preferably $C_1$–$C_6$ alkyl, or phenyl, which can be substituted by $C_1$–$C_8$ alkyl and/or hydroxyl. For example, R" can be methyl, ethyl, butyl, hexyl, phenyl, 4-butylphenyl, 2-hydroxyphenyl or 3,5-di-tert.-butyl-4-hydroxyphenyl. R'" can be phenyl or alkylphenyl, for example tolyl or isopropylphenyl.

Preferred ligands of the formula VI are those in which Y is oxo or =NR$_6$, $R_2$ is $C_1$–$C_{12}$ alkyl or phenyl and $R_3$ is hydrogen, or $R_2$ and $R_3$ together are 1,4-butadienylene, and in which $R_4$ is $C_1$–$C_{12}$ alkyl or $C_1$–$C_{12}$ alkoxy. Particularly preferred ligands of the formula VI are those in which Y is oxo.

Examples of enolate ions of the formula VI are the anions of acetylacetone, benzoylacetone, p-chlorobenzoylacetone, 1-phenylacetylacetone, naphthoylacetone p-isopropylbenzoylacetone, dibenzoylmethane, 1,1-dibenzoylethane, methyl acetoacetate, ethyl benzoylacetate, ethyl α-phenyl-acetoacetate, dibutyl benzoylmalonate, ethyl α-acetylbutyrate, ethyl α-acetyl-acetoacetate, dimethyl α-acetylsuccinate, isopropyl salicylate, 2-hydroxyacetophenone, 2-hydroxybutyrophenone, 2-hydroxybenzophenone, 2-hydroxy-4-acetyloxy-benzophenone, α-acetylcyclohexanone, 4-phenylimino-pentan-2-one, 2-hydroxyacetophenone-N-benzylimine, 2-hydroxyacetophenone-N-methylimine, salicylamide, acetoacetic acid dihexylamide, benzoylacetic acid dibutylamide, cyclohexylcarbonylacetic acid cyclohexylamide, 1-phenyl-3-methyl-4-acetylpyrazol-5-one, 1-phenyl-3-methyl-4-decanoyl-pyrazol-5-one, 1,2,2,6,6-pentamethylpiperidin-4-yl acetoacetate, benzoylacetic acid N-(1-benzyl-2,2,6,6-tetramethyl-piperidin-4-yl)-N-butylamide, 2-(2,2,6,6-tetramethylpiperidin-1-yl)-ethyl acetoacetate, bis-(2,2,6,6-tetramethylpiperidin-4-yl) α-acetylmalonate or ethyl 4-hydroxy-3,5-di-tert.-butyl-benzoyl-acetate. Amongst these, the anion of acetylacetone is particularly preferred.

The definition of the metal compound MeL$_w$ results from these definitions of Me and L. For example, the following can be used according to the invention as the metal compound MeL$_w$: manganese acetate, magnesium propionate, calcium laurate, strontium stearate, zinc salicylate, nickel palmitate, dibutyltin bis-(3,5-di-tert.-butyl-4-hydroxyphenylacetate), barium 2-ethylcaproate, vanadyl salicylate, molybdenum dioxy-bis-(3,5-di-tert.-butyl-4-hydroxybenzoate), magnesium oleate, zinc bis-(butylaminoacetate), calcium bis-(cyclohexylaminoacetate), cobalt bis-[2-(1,2,2,6,6-pentamethylpiperidin-4-oxy)-propionate], aluminium tris-(2,2,6,6-tetramethyl-4-aminopiperidine-4-carboxylate), cobalt bis-(dicyclohexylphosphinate), cadmium bis-(O-monomethyl-butylphosphonate), nickel alaninate, cobalt p-dibutylaminobenzoate, nickel bis-(O-monoethyl-α-hexylaminobenzylphosphonate), magnesium bis-(O-monobutyl-hexylphosphonate), cobalt bis-(O-monoethyl-2-hydroxyhexylphosphonate), aluminium tris-(O-monobutyl-4-hydroxy-3,5-di-tert.-butyl-benzylphosphonate), cobalt bis-(O-monoethyldiethylaminomethylphosphonate), cobalt bis-(O-monomethyl-morpholinomethylphosphonate), nickel bis-[O-monobutyl-2-(2,2,6,6-tetramethylpiperidino)ethylphosphonate], aluminium tris-[α-(1,2,2,6,6-pentamethylpiperidinyl-4-amino)-heptylphosphonate], zinc-II acetylacetonate, chromium-III acetylacetonate, cobalt-II benzoylacetate, the cadmium 1:2 chelate of dibenzoylmethane, the zinc 1:2 chelate of 6-ethylhexane-2,4-dione, the cobalt 1:2 chelate of salicylic acid dimethylamide, the aluminium 1:3 chelate of 2-hydroxyacetophenone, the cobalt 1:2 chelate of 1,2,2,6,6-pentamethylpiperidin-4-yl acetoacetate, the nickel 1:2 chelate of 1-phenyl-3-methyl-4-benzoylpyrazol-5-one, the nickel 1:2 chelate of N-butyl-salicylaldimine, the cobalt 1:2 chelate of 2-hydroxyacetophenone-N-phenylimine, the nickel 1:2 chelate of 2-hydroxy-4-octyloxy-benzophenone or nickel-II 3-ethoxycarbonylacetylacetonate.

Whilst according to the invention all polymers which contain a polyalkylpiperidine radical of the formula I to V are suitable as component (a), consideration of the synthesis possibilities for incorporating the radical into polymers shows that the piperidine residues of the following structures VII to XXVI are particularly suitable:

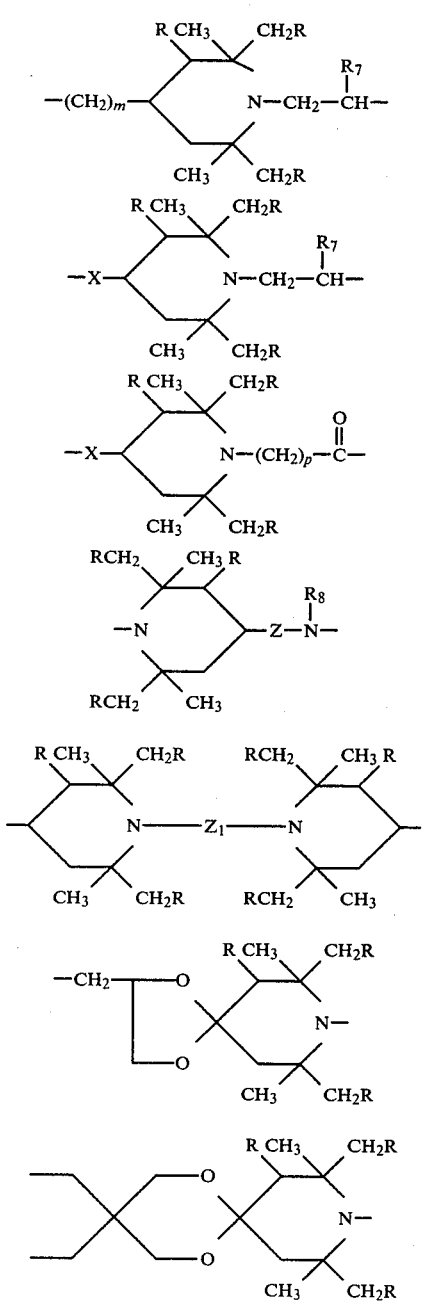

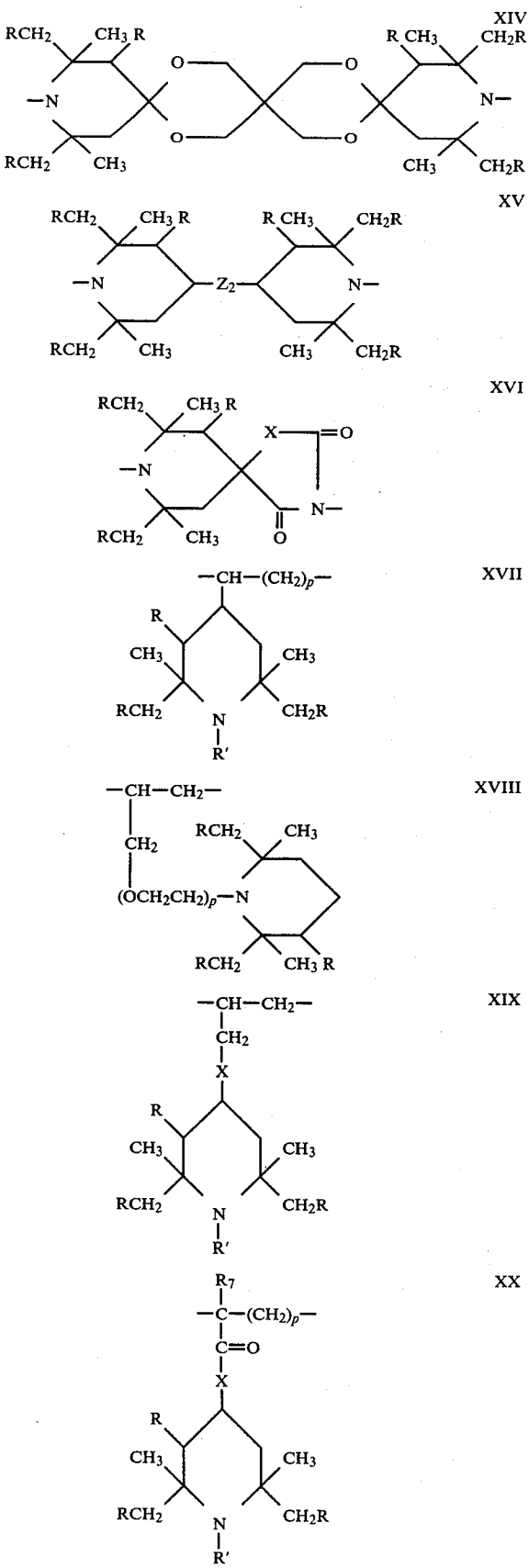

-continued

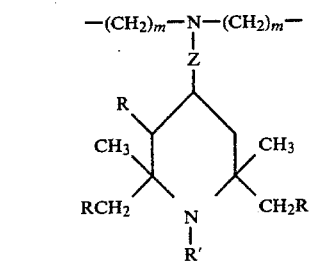

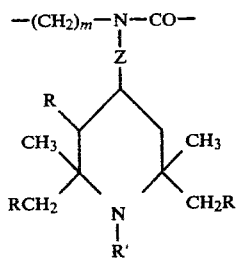

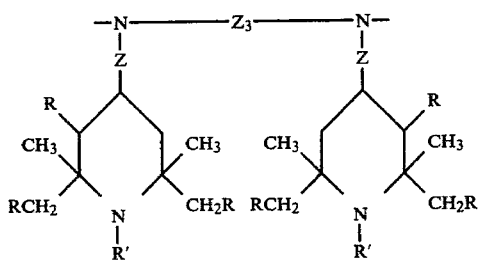

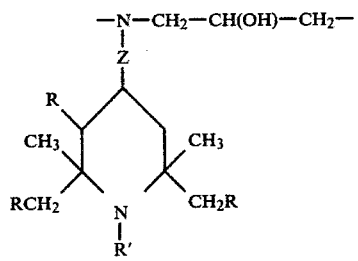

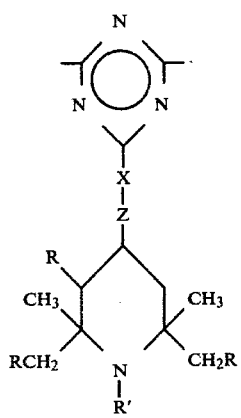

-continued

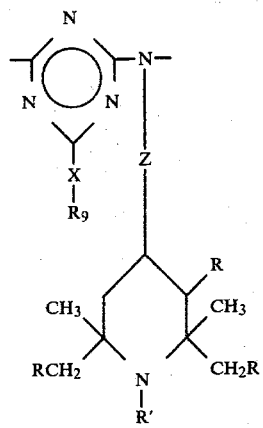

in which R and R' are as defined initially, m is 1, 2 or 3, p is nought or 1, $R_7$ is hydrogen, methyl or phenyl, X is oxygen or $NR_8$, $R_8$ and $R_9$ independently of one another are hydrogen, $C_1$–$C_{18}$ alkyl, $C_5$–$C_{12}$ cycloalkyl, $C_7$–$C_{11}$ aralkyl or phenyl, Z is a direct bond or a group of the formula —$CH_2CH_2$— or —$OCH_2CH_2CH_2$—, $Z_1$ is $C_4$–$C_8$ alkylene, $C_4$–$C_8$ alkenylene or p-xylylene, $Z_2$ is $C_4$–$C_{10}$ alkylene, p-xylylene,

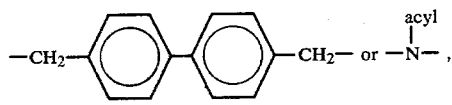

in which acyl is $C_2$–$C_8$ alkanoyl or $C_3$–$C_5$ alkenoyl, $Z_3$ is $C_2$–$C_{12}$ alkylene, $C_6$–$C_{12}$ arylene, 4,4'-dicyclohexylenemethane or a radical of the formula phenylene-$Z_4$-phenylene and $Z_4$ is —$CH_2$—, >$C(CH_3)_2$, —O— or —$SO_2$—.

Thus, for example, compounds of the formula HO-VII-OH or HOOC-VII-COOH or alkyl-OOC-VII-COO-alkyl or also HO-VII-COOH are suitable for incorporating the structure VII into polyesters. Suitable compounds for incorporating the same structure into polyamides are those of the formula $H_2N$-VII-$NH_2$, HOOC-VII-COOH, $H_2N$-VII-COO-alkyl or also $H_2N$-VII-$CH_2NH_2$.

In a similar manner, compounds of the formula H-VIII-OH, H-VIII-COOH, HO-$CH_2CH_2$-VIII-OH, H-VIII-$CH_2NH_2$ or HOOC-$CH_2$-VIII-COOH can be used to incorporate a structure of the formula VIII. Difunctional piperidine derivatives of this type which are suitable for polycondensation reactions are known compounds or can be prepared in an analogous manner.

Polymerisable derivatives of polyalkylpiperidines are, for example, acrylates and methacrylates of 4-hydroxypiperidines or (meth)acrylamides of 4-aminopiperidines, such as are described in German Offenlegungsschrift No. 2,040,983. These derivatives are suitable for homopolymerisation and for copolymerisation with other unsaturated compounds, preferably with other acrylic acid derivatives or methacrylic acid derivatives.

Epoxide derivatives of polyalkylpiperidines can be used either for polymerisation or for polyaddition. For example, 4-glycidyl ethers of 1-alkylpiperidines can be converted to polyethers by ring-opening polymerisation. 4-Bisglycidylaminopiperidines or 1-glycidyl-4- glycidyl ethers of piperidines, on the other hand, can be converted to polyamines by polyaddition with diamines or to aromatic polyethers by polyaddition with bisphenols.

Triazine-containing polymers containing the structures XXV or XXVI can be prepared by the process of German Offenlegungsschrift No. 2,636,144. Polyamines which contain the structure XXIII are known from German Offenlegungsschrift No. 2,611,208.

Particularly preferred mixtures are those which contain, as component (a), the following types of polymers:
(1) Polyesters, the recurring structural unit of which contains a polyalkylpiperidine ring of the formula VIII, IX, XXI or XXIII, in which m is 1 or 2, R and R' are hydrogen or methyl and p, $R_7$, X, Z and $Z_3$ are as defined above,
(2) Polyamides, the recurring structural unit of which contains a radical of the formula XV, XXI or XXIII, in which R and R' are hydrogen or methyl and m, Z, $Z_2$ and $Z_3$ are as defined above,
(3) Polyaminotriazines, the recurring structural unit of which contains a radical of the formula X, XXIII, XXV or XXVI, in which X is $NR_8$, Z is a direct bond, R and R' are hydrogen or methyl and $R_8$, $R_9$ and $Z_3$ are as defined above,
(4) Polyamines, the recurring structural unit of which contains a radical of the formula XXIII or XXIV, in which Z is a direct bond, R and R' are hydrogen or methyl and $Z_3$ is as defined above,
(5) Polyacrylates or polymethacrylates, the recurring structural unit of which contains a radical of the formula XX, in which p is 1 and $R_7$ is hydrogen, X is oxygen, and R and R' are hydrogen or methyl, and
(6) Copolymers of an acrylate or methacrylate, which contains a polyalkylpiperidine radical in the ester radical, and an ethylenically unsaturated monomer, preferably an acrylate or methacrylate, which does not contain a piperidine radical.

Examples of polyesters which can be used as component (a) are the polymers of the following formulae, in which n indicates the degree of polymerisation, which can be 2 to about 200 but is usually in the range of 5 to 20. These polymers also include copolyesters, such as are formed, for example, when two different dicarboxylic acids or diols are used:

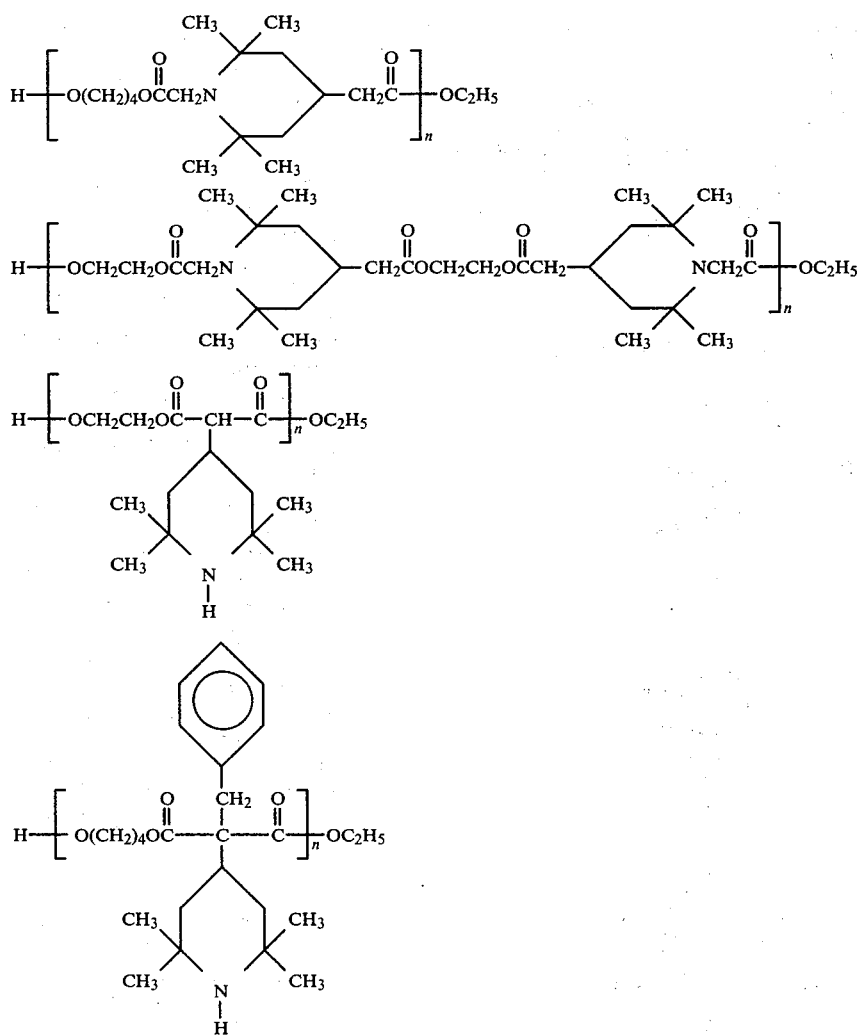

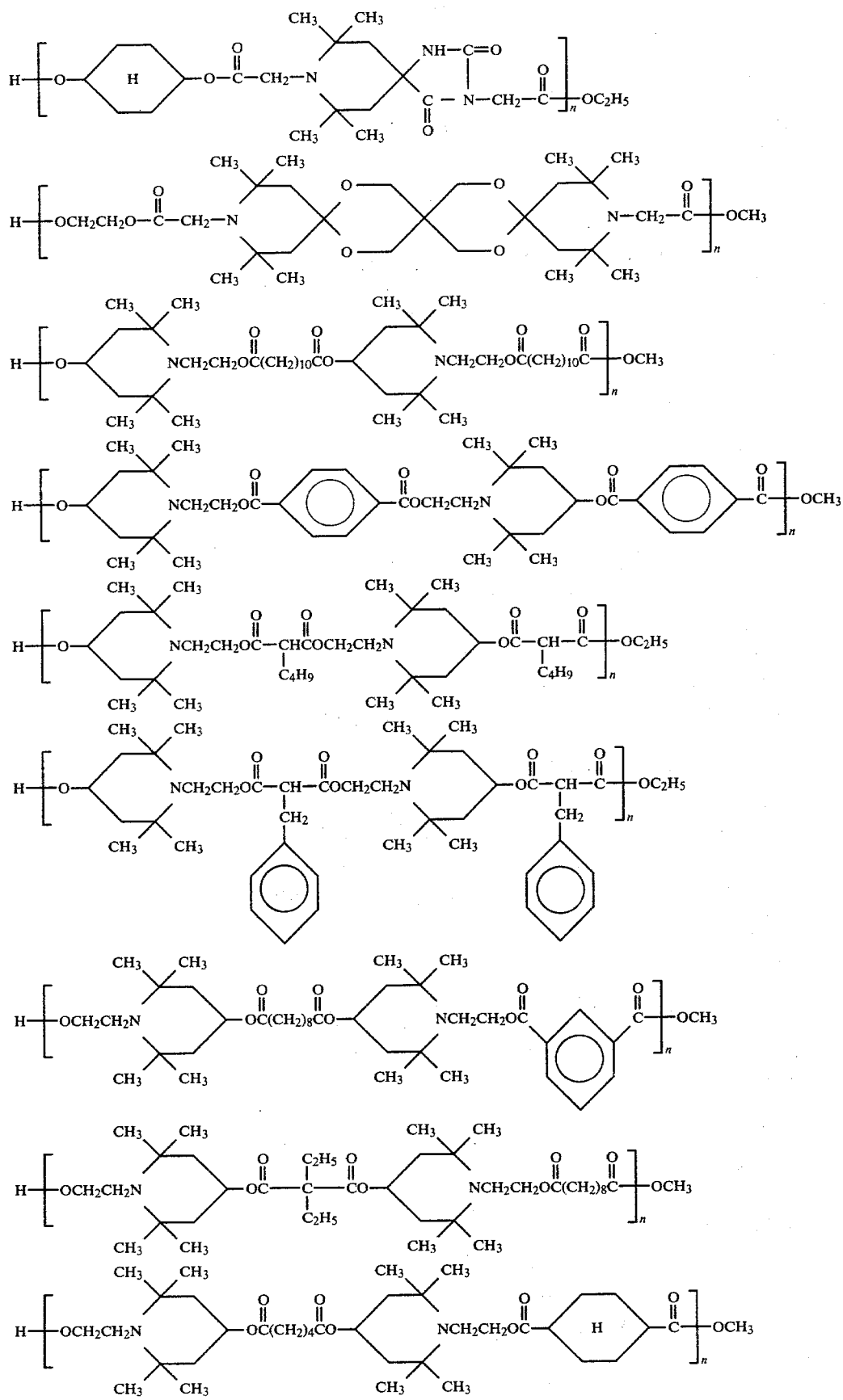

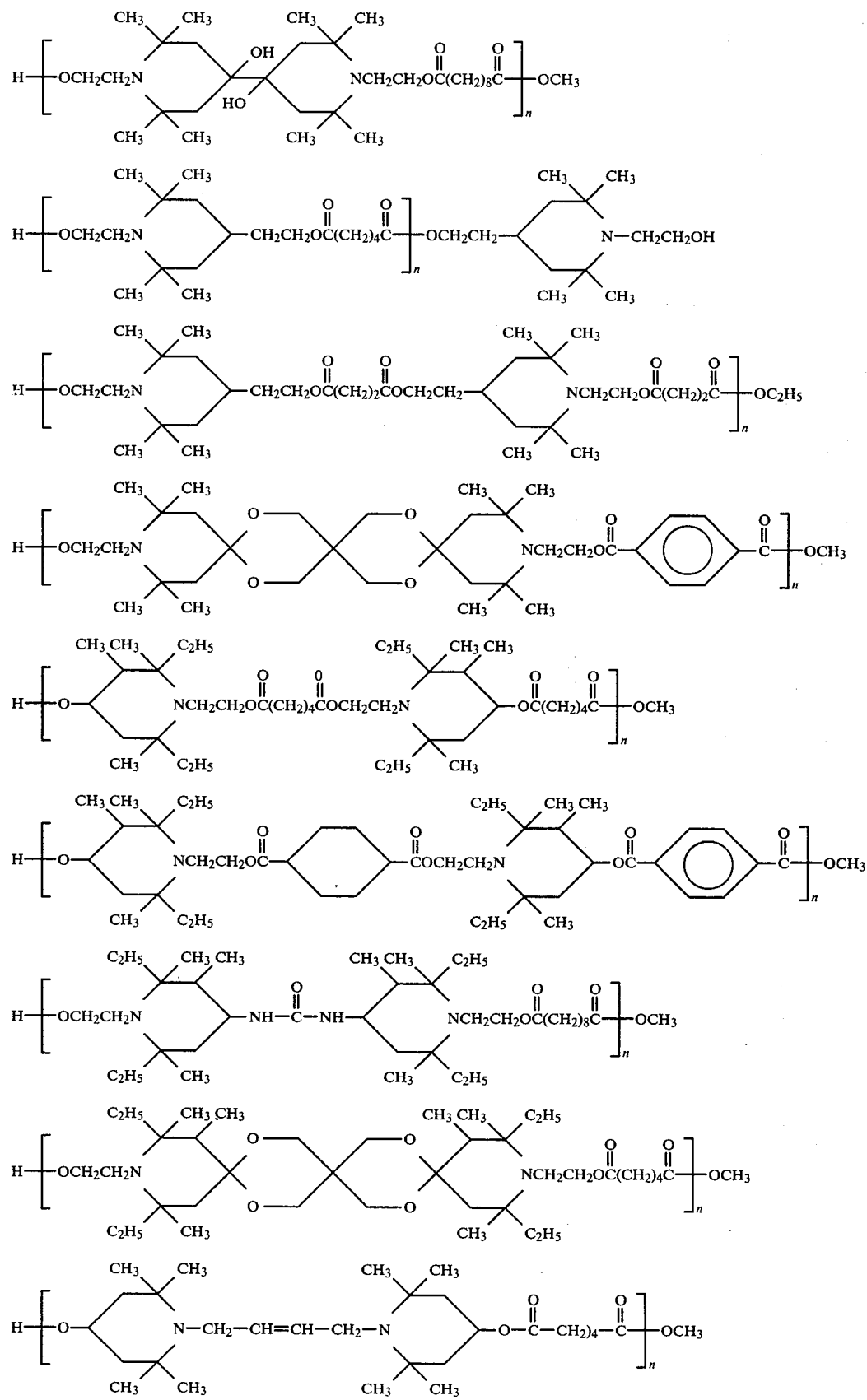

-continued
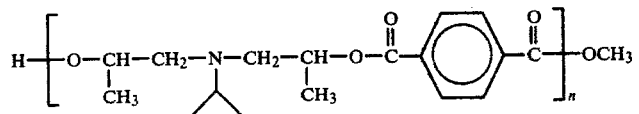
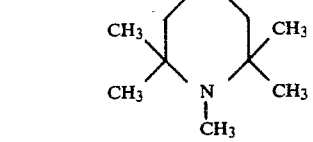
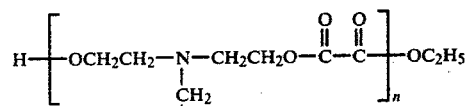
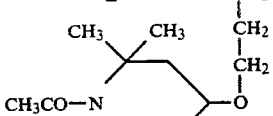
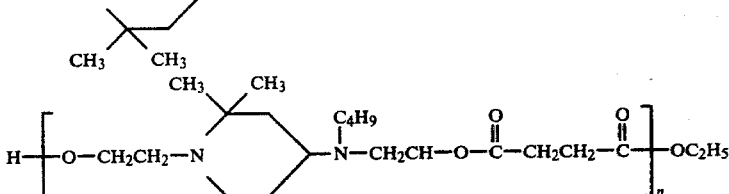
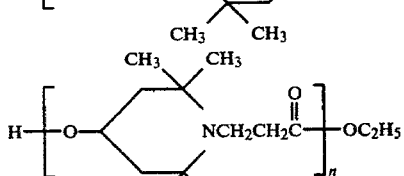
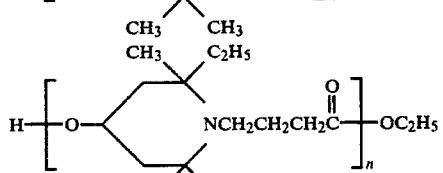
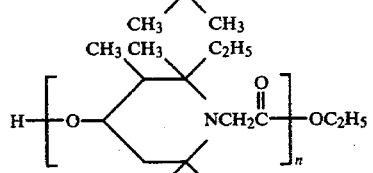
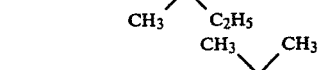
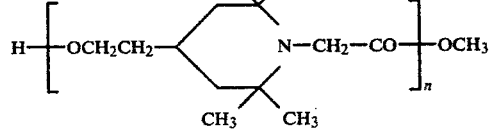
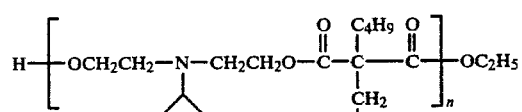
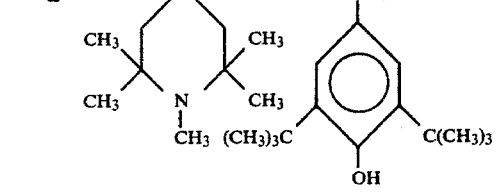

Examples of polyamides as component (a) are the following polymers:
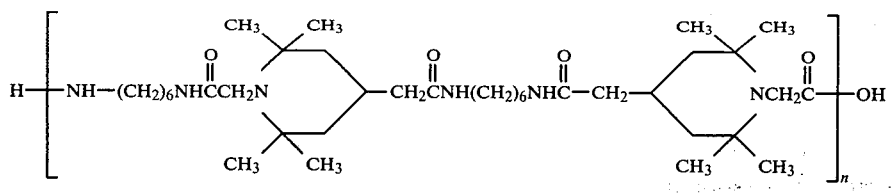
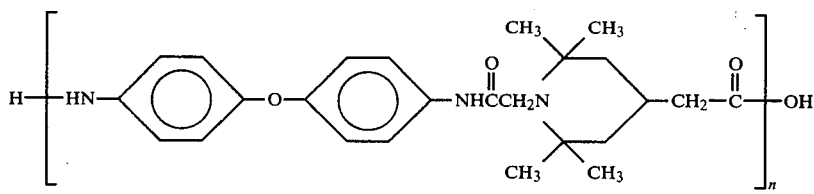
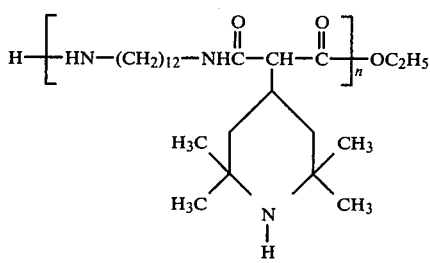
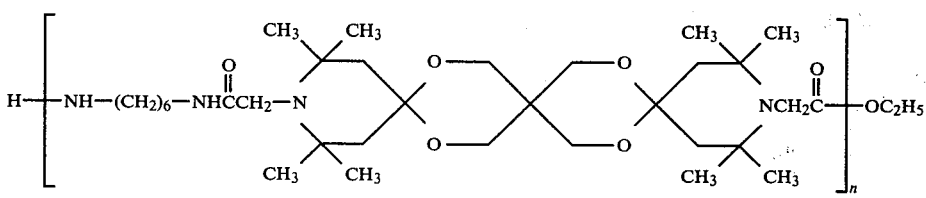
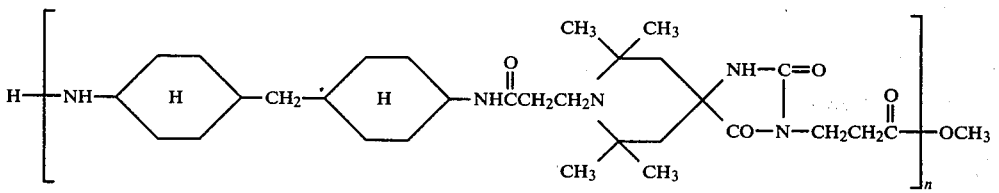
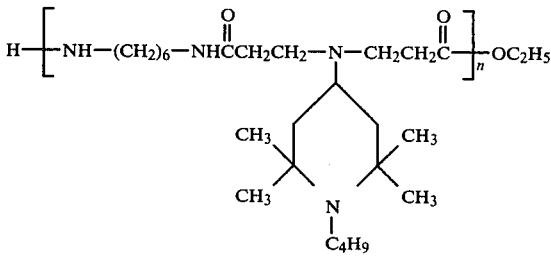
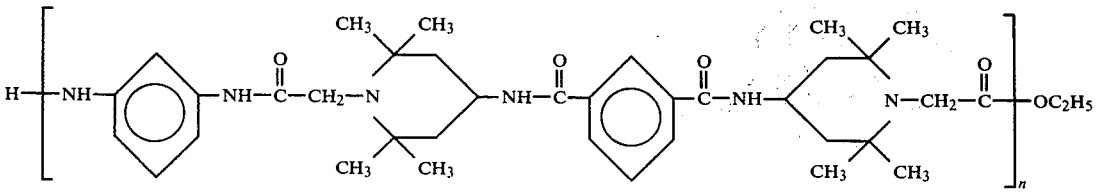

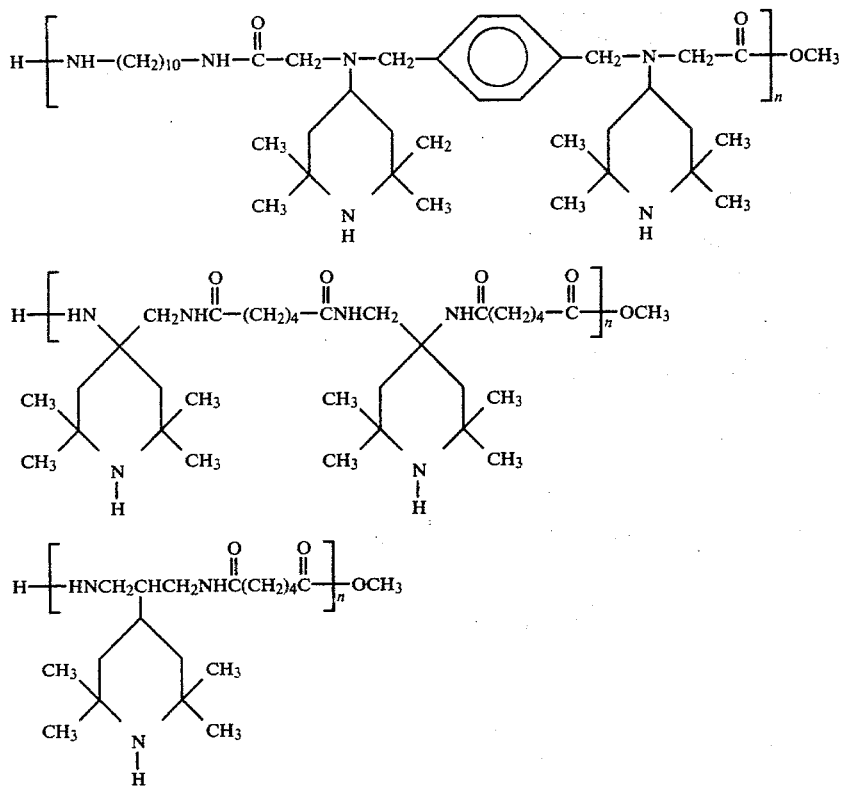
Examples of polyurethanes and polyureas are the following compounds:
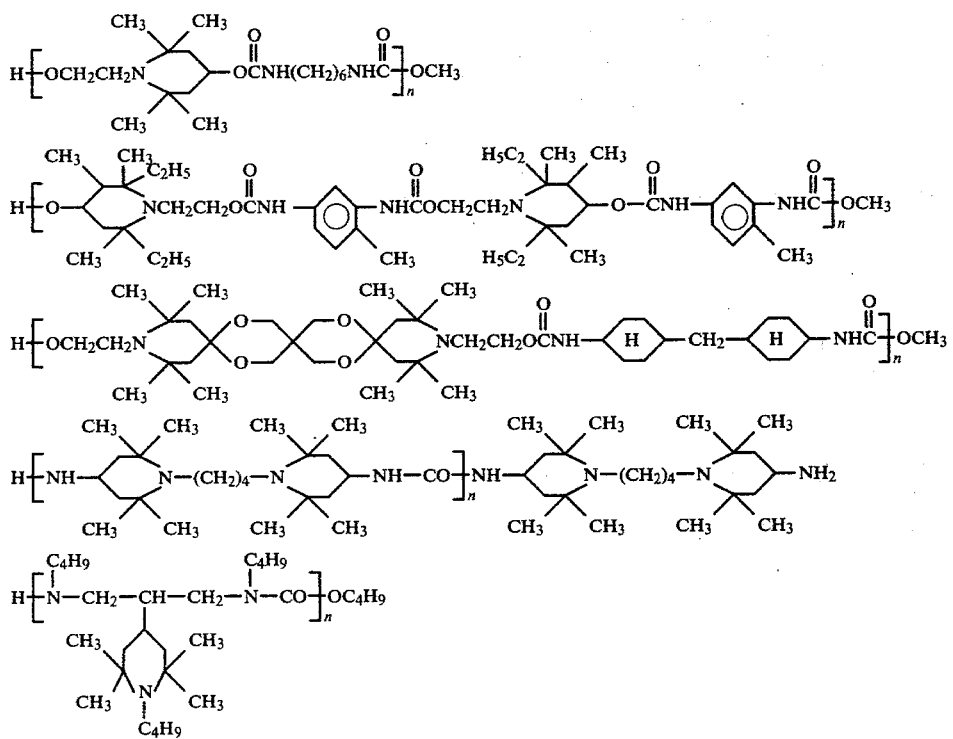

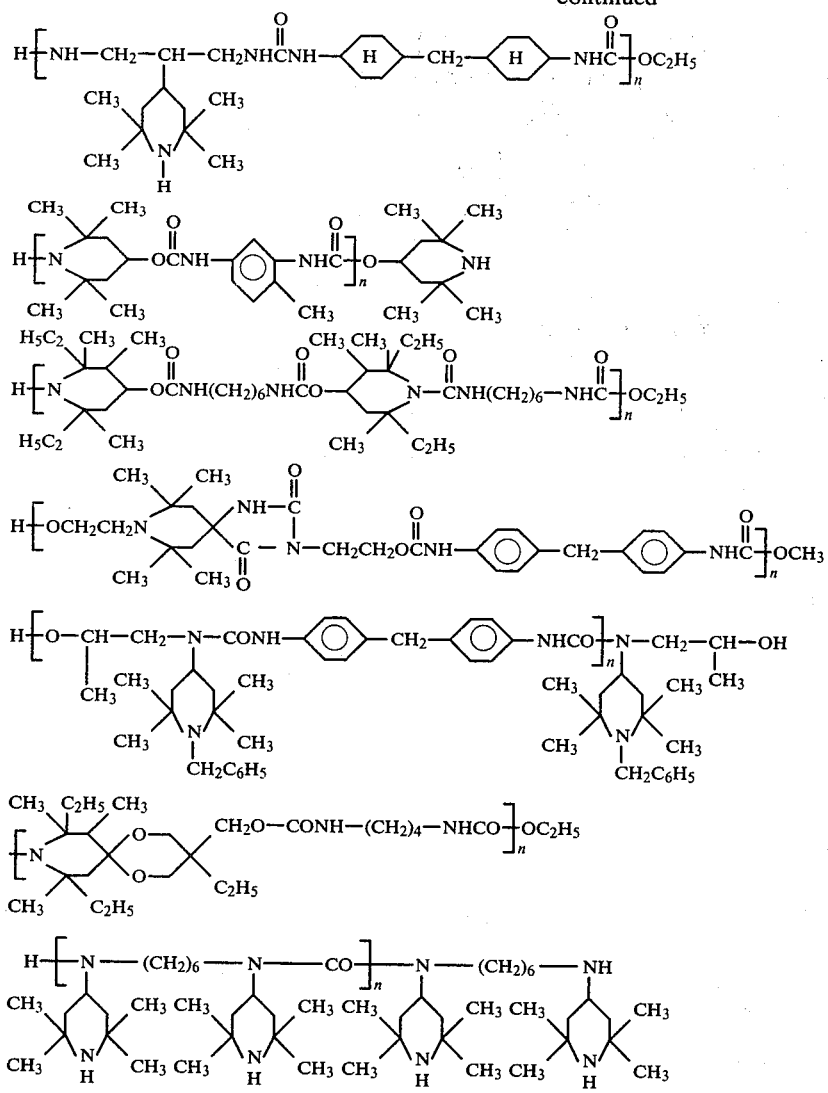
Examples of polyethers as component (a) are represented by the following formulae:
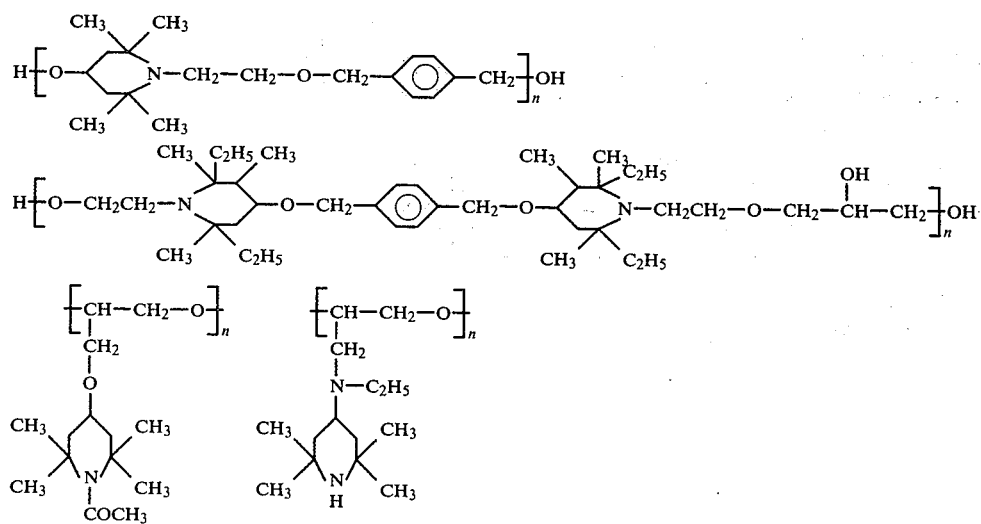

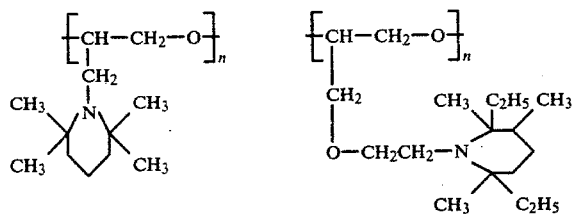
Examples of polyamines as component (a) are the following compounds:
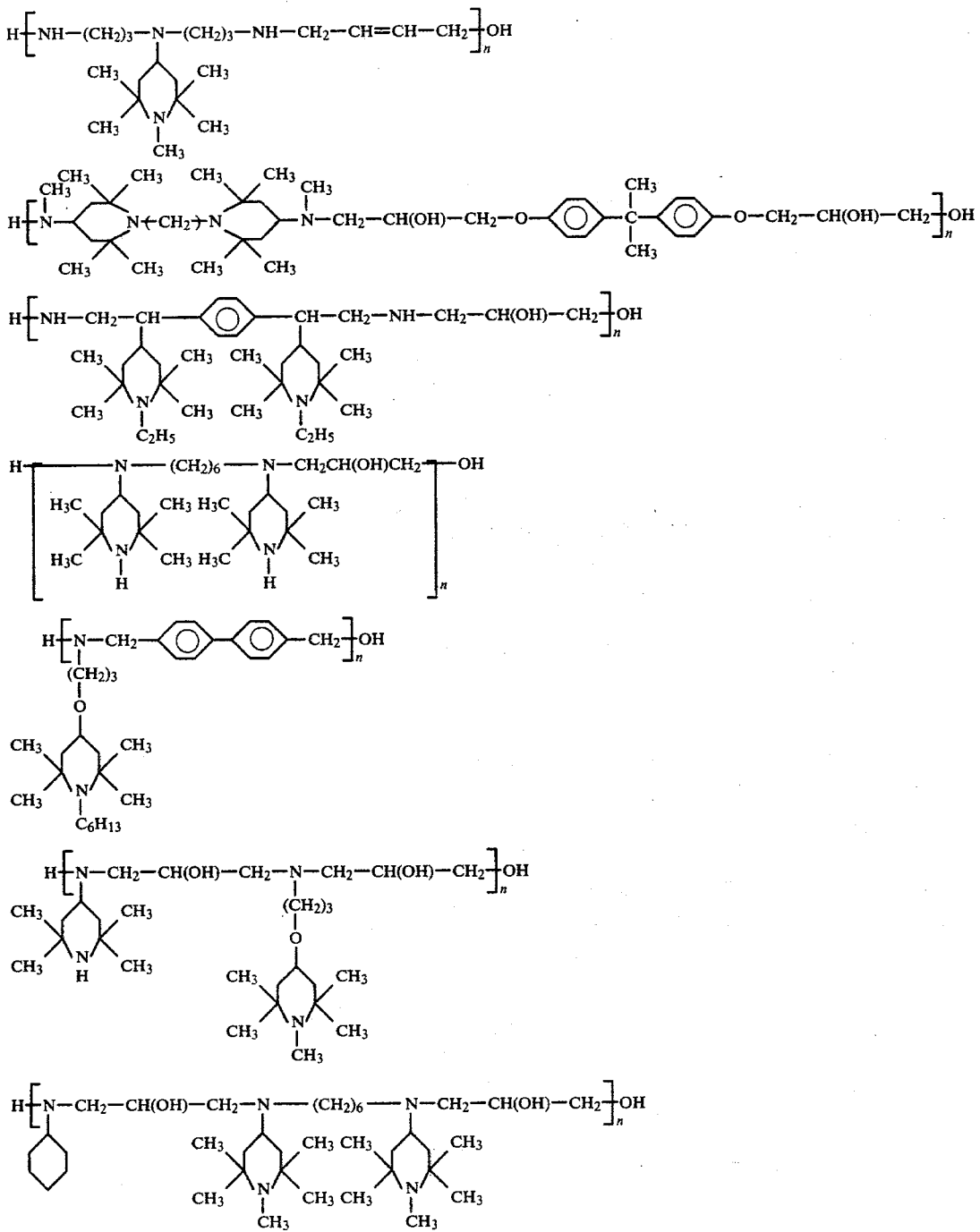

-continued
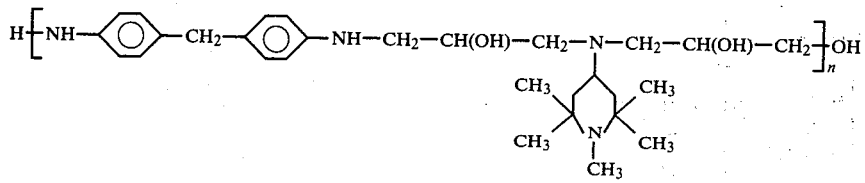
Examples of polyaminotriazines as component (a) are the following compounds:
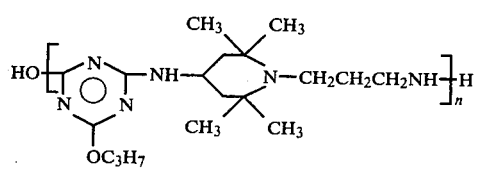
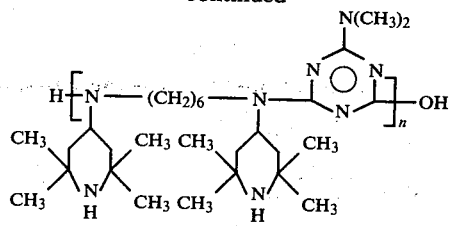
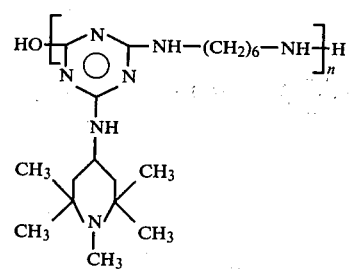
Examples of copolycondensates are the following polyester-amides:
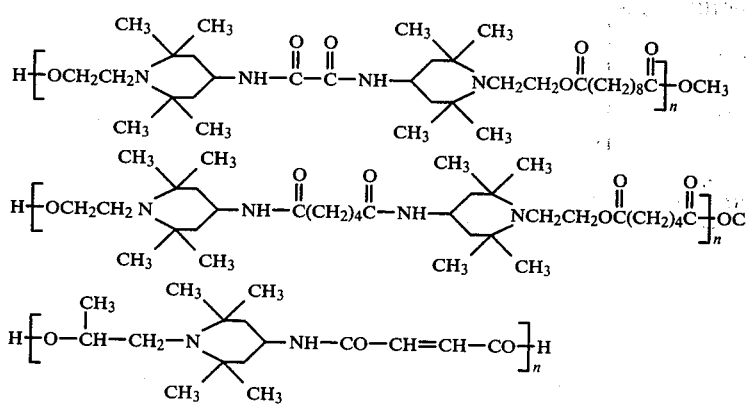
polyester-ureas:
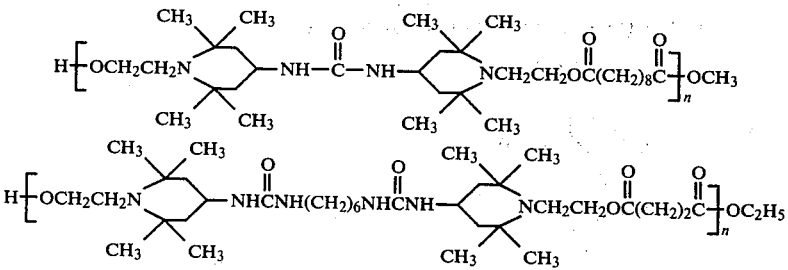
polyester-urethanes:
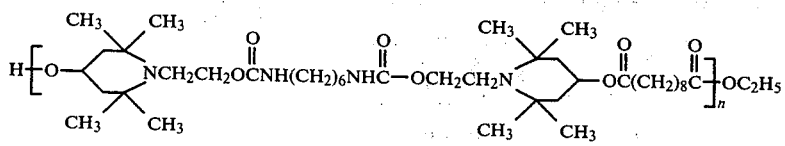

-continued
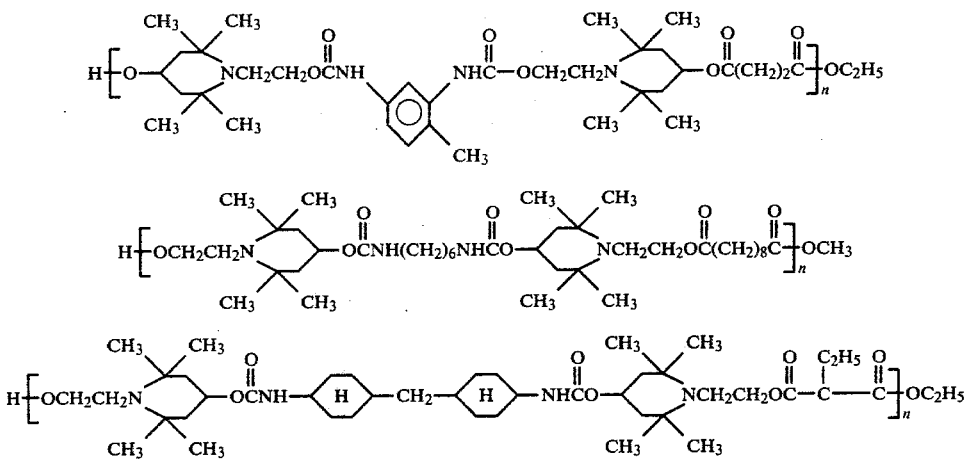
polyurethane-ureas:
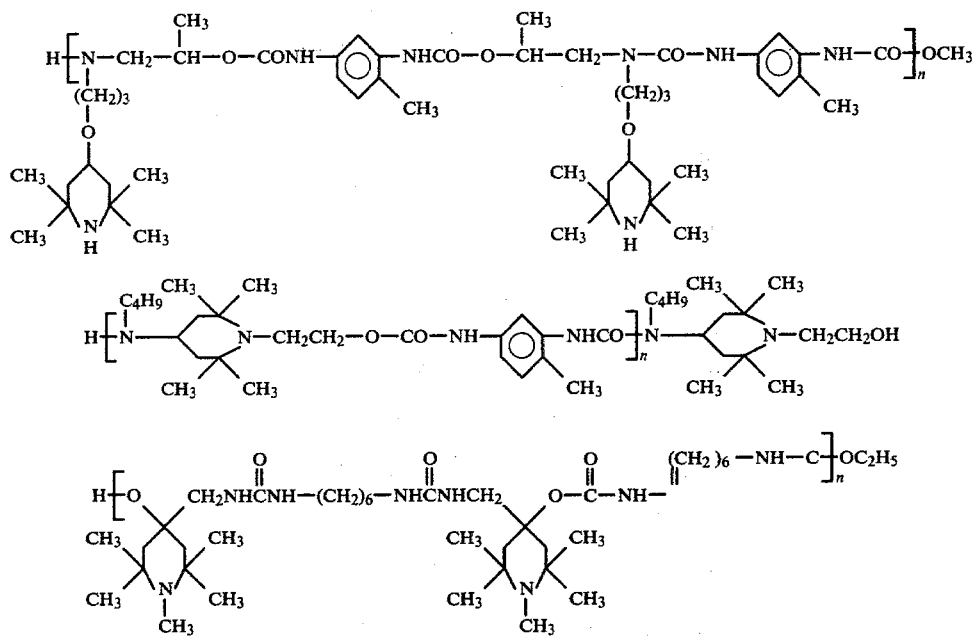
polyether-amides:
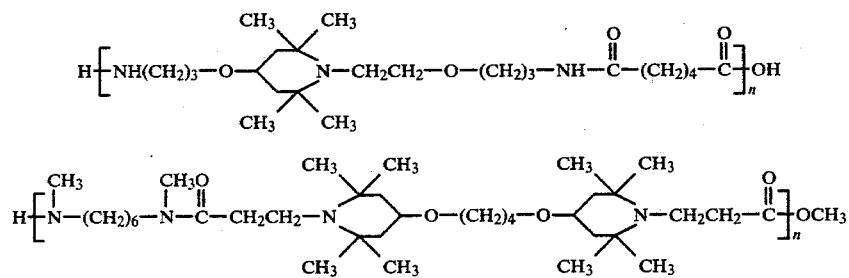
or polyether-amines:
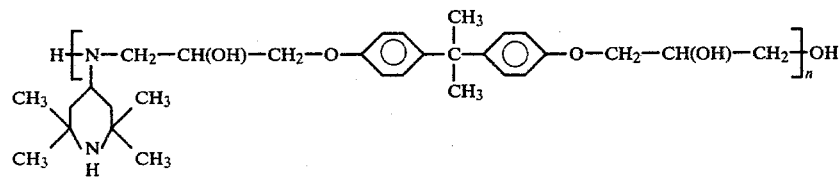

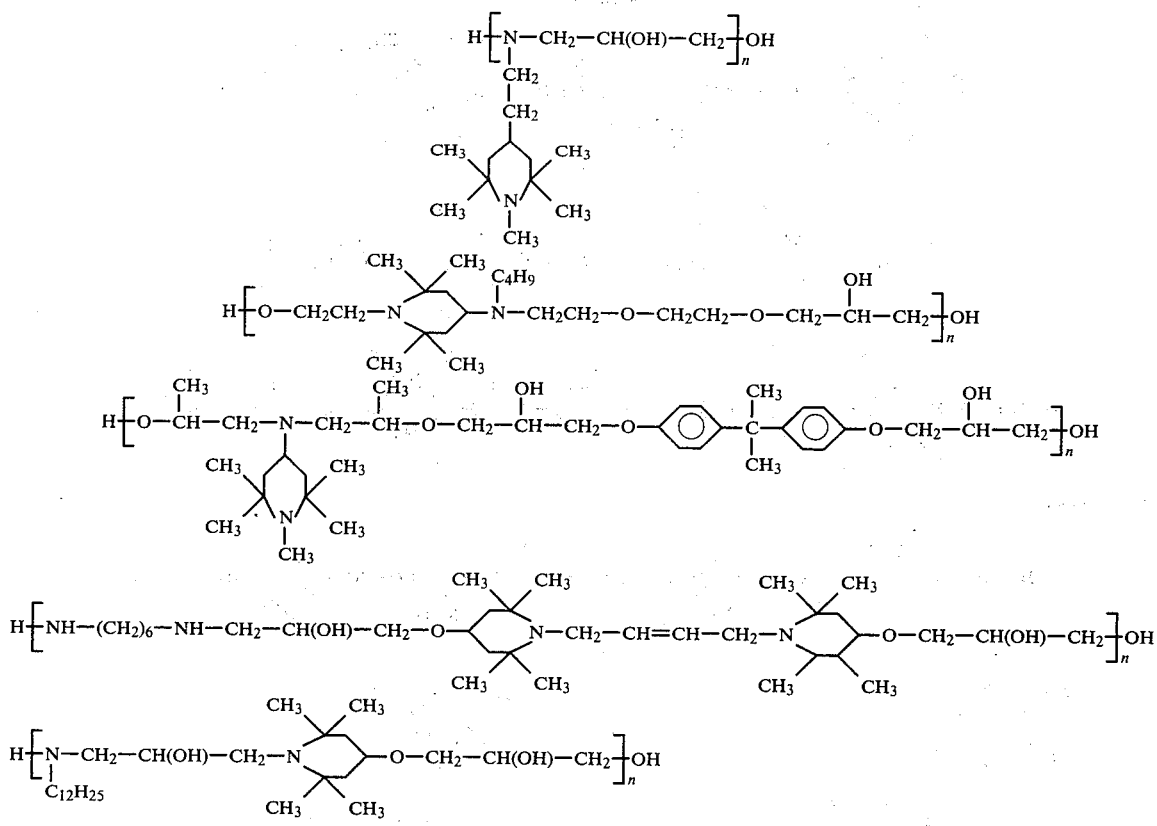

The preparation of condensation or addition polymers such as those in the examples listed above is effected by the conventional methods of polycondensation or polyaddition, for example by reacting two difunctional components, for example a dicarboxylic acid with a diol or a diamine. Components suitable for single component polycondensation are those having two different functional groups, for example aminocarboxylic acids or hydroxycarboxylic acid esters. Ring-opening polymerisation also leads to the same types of polymers (polyesters, polyamides and polyethers), for example the polymerisation of lactones or lactams or of cyclic ethers. These methods for the preparation of polymers are generally known and the methods require no modification when polyalkylpiperidine derivatives are used as the monomers.

The polymerisation of unsaturated polyalkylpiperidine compounds also proceeds by the known methods, for example by free radical, anionic or cationic initiation. The polymerisation is mainly carried out with free radical initiation, using initiators such as, for example, azoisobutyronitrile, dibenzoyl peroxide or redox systems.

Examples of unsaturated polyalkylpiperidine derivatives which can be polymerised and the polymers of which can be used as component (a) according to the invention are those which follow: 1-methacryloyloxyethyl-2,2,6,6-tetramethyl-piperidine, 1-acryloyloxyethyl-2,2,6,6-tetramethyl-piperidine, 1,2,2,6,6-pentamethyl-4-maleimido-piperidine, 1-acetyl-2,2,6,6-tetramethyl-4-maleimido-piperidine, 1-benzyl-2,2,6,6-tetramethyl-4-maleimido-piperidine, 1,3,8-triaza-2,4-dioxo-3-acryloyl-oxyethyl-7,7,8,9,9-pentamethyl-spiro-[4,5]-decane, 1,3,8-triaza-2,4-dioxo-3-methacryloyl-oxyethyl-7,7,8,9,9-pentamethyl-spiro-[4,5]-decane, 1,3,8-triaza-2,4-dioxo-3-n-dodecyl-7,7,9,9-tetramethyl-8-methacryloyl-oxyethyl-spiro-[4,5]-decane, 1,3,8-triaza-2,4-dioxo-3-methacryloyl-oxyethyl-7,7,9,9-tetramethyl-8-benzyl-spiro-[4,5]-decane, 1,3,8-triaza-2,4-dioxo-3-n-butyl-7,7,9,9-tetramethyl-8-acryloyl-oxyethyl-spiro-[4,5]-decane, 1-benzyl-2,2,6,6-tetramethyl-4-(N-n-butyl)-methacrylamidopiperidine, 1,2,2,6,6-pentamethyl-4-(N-benzyl)-acrylamidopiperidine, 1,2,2,6,6-pentamethyl-4-(N-n-propyl)-acrylamidopiperidine, 1,2,2,6,6-pentamethyl-4-(N-n-propyl)-methacrylamidopiperidine, 1-allyl-2,2,6,6-tetramethyl-4-acryloyloxypiperidine, 1-allyl-2,2,6,6-tetramethyl-4-methacryloyloxypiperidine, 1,2,2,6,6-pentamethyl-4-acrylamido-piperidine, 1-benzyl-2,2,6,6-tetramethyl-4-(N-n-butyl)-acrylamido-piperidine, 1-benzyl-2,2,6,6-tetramethyl-4-acrylamido-piperidine and 1-[3'-acryloyloxy-(2'-hydroxy)-propyl]-2,2,6,6-tetramethyl-piperidine.

Unsaturated polyalkylpiperidine compounds of this type can be copolymerised with other unsaturated monomers. Monomers suitable for this purpose are, for example, unsaturated esters, for example methyl acrylate, butyl acrylate, 2-hydroxyethyl acrylate, methyl methacrylate, diethyl fumarate, ethyl crotonate or dimethyl maleate; or unsaturated amides, for example N-dibutyl-acrylamide, N-hydroxyethyl-acrylamide, methacrylic acid diethanolamide or crotonamide. Examples of further suitable comonomers are acrylonitrile, methacrylonitrile, styrene, α-methylstyrene, N-vinylpyrrolidone, vinyl acetate, vinyl propionate, isopropyl vinyl ether or N-butylmaleimide. The molar ratio of the piperidine component and comonomer should be at least 1:10 and copolymers which contain at least 25 mol % of the piperidine component are preferred. Di-unsaturated monomers, for example divinylbenzene, ethylene glycol dimethacrylate or methylene-bisacrylamide, can also additionally be used in small amounts. Comonomers of this type effect partial crosslinking and should only be present in an amount of at most 5 mol % and preferably of less than 1 mol %.

All of these piperidine-containing polymers of component (a) already act on their own as light stabilisers for plastics, but their action is greatly further intensified by the addition of component (b). In the case of some polymers, this intensification of the action can already become clearly discernible when small amounts of (b) are added; in the case of other polymers this effect arises only when larger amounts are added. In other words: the optimum ratio of (a) to (b) cannot be predicted; it must be determined experimentally in each individual case.

It is possible that the metal atom of component (b) adds on coordinatively to the piperidine nitrogen atom of component (a). It is difficult to obtain precise confirmation of this because the polymers are not single compounds. When an attempt is made to preform such a coordinative adduct of (a) and (b) by melting the two components or by evaporation from a common solution of the two components, the stabilising effect of an adduct preformed in this way is the same as that of a simple mixture. This can, of course, also be due to the fact that such adduct formation takes place to the full or partial extent during incorporation of the mixture into the plastic, which usually is effected at relatively high temperatures.

The mixtures according to the invention can therefore be produced in any form. The simplest manner is to mix the two components in powder form. It is also possible to spray one component in a dissolved form onto the other component in powder form and to evaporate the solvent. Alternatively, the individual components are mixed in solution and the solvent is evaporated. Examples of suitable solvents are toluene, xylene, ethanol, isopropanol, chloroform or acetonitrile. Finally, mixing can also be effected only in the plastic to be stabilised by adding components (a) and (b) separately to this plastic, for example during a granulating process.

Compared with the metal complexes of monomeric polyalkylpiperidine derivatives known from German Offenlegungsschrift No. 2,625,867, the mixtures, according to the invention, of polymeric piperidine derivatives and metal compounds have the advantage of a higher stability to extraction and migration in plastics. This advantage is surprising insofar as the solubility of additives for plastics in the plastic falls on transition from monomeric to polymeric additives and this usually results in a severe decline in the compatibility in the plastic. By contrast, the mixtures according to the invention show a surprisingly good compatibility in the customary plastics and no blooming occurs when the concentrations of the additive are those customary in practice.

Examples of plastics which can be stabilised by the addition of the mixtures according to the invention are those which follow:

1. Polymers of mono- and di-olefins, for example polyethylene (which can be crosslinked), polypropylene, polyisobutylene, polymethylbut-1-ene, polymethylpent-1-ene, polyisoprene or polybutadiene.
2. Mixtures of the polymers mentioned under (1), for example mixtures of polypropylene with polyethylene or with polyisobutylene, or, for example, mixtures of two polyethylenes of different density or of different melt index.
3. Copolymers of mono- and di-olefins, for example ethylene-propylene copolymers, propylene-but-1-ene copolymers, propylene-isobutylene copolymers and ethylene-but-1-ene copolymers, and also terpolymers of ethylene with propylene and a diene, such as hexadiene, dicyclopentadiene or ethylidenenorbornene.
4. Polystyrene.
5. Copolymers of styrene or $\alpha$-methylstyrene with dienes or acrylic derivatives, for example styrene-butadiene, styrene-acrylonitrile and styrene-acrylonitrile-methyl acrylate; mixtures of high impact strength obtained from styrene copolymers and another polymer, for example a polyacrylate, a diene polymer or an ethylene-propylene-diene terpolymer; and also block copolymers of styrene, for example styrene-butadiene-styrene, styrene-isoprene-styrene or styrene-ethylene/butylene styrene.
6. Graft copolymers of styrene, for example styrene on polybutadiene, and styrene and acrylonitrile on polybutadiene, and also mixtures thereof with the copolymers mentioned under (5), such as those known as ABS polymers.
7. Halogen-containing polymers, for example polyvinyl chloride, polyvinylidene chloride, polyvinyl fluoride, polychloroprene, chlorinated rubbers and copolymers such as vinyl chloride-vinylidene chloride, vinyl chloride-vinyl acetate or vinylidene chloride-vinyl acetate.
8. Polymers which are derived from $\alpha,\beta$-unsaturated acids and their derivatives, such as polyacrylates and polymethacrylates, polyacrylamides and polyacrylonitrile.
9. Polymers which are derived from unsaturated alcohols and amines or their acyl derivatives or acetals, such as polyvinyl alcohol, polyvinyl acetate, polyvinyl stearate, polyvinyl benzoate, polyvinyl maleate, polyvinyl butyrate, polyallyl phthalate and polyallylmelamine, and their copolymers with other vinyl compounds, such as ethylene/vinyl acetate copolymers.
10. Homopolymers and copolymers of epoxides, such as polyethylene oxide and polypropylene oxide or their copolymers with bis-glycidyl ethers.
11. Polyacetals, such as polyoxymethylene and also those polyoxymethylenes which contain ethylene oxide as a comonomer.
12. Polyphenylene oxides.
13. Polyurethanes and polyureas.
14. Polycarbonates.
15. Polysulphones.
16. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.
17. Polyesters which are derived from dicarboxylic acids and dialcohols and/or from hydroxycarboxylic acids or the corresponding lactones, such as polyethylene terephthalate, polybutylene terephthalate, poly-1,4-dimethylol-cyclohexane terephthalate and copolyether-esters.
18. Crosslinked polymers which are derived from aldehydes on the one hand and phenols, ureas and mel-amines on the other, such as phenol-formaldehyde, urea-formaldehyde and melamine-formaldehyde resins.

19. Alkyd resins, such as glycerine-phthalic acid resins and their mixtures with melamine-formaldehyde resins.
20. Unsaturated polyester resins which are derived from copolyesters of saturated and unsaturated dicarboxylic acids with polyhydric alcohols, with vinyl compounds as crosslinking agents, and also their halogen-containing modifications of low imflammability.
21. Crosslinked epoxide resins which are derived from polyepoxides, for example from bis-glycidyl ethers or from cycloaliphatic diepoxides.
22. Natural polymers, such as cellulose, rubber, proteins and their polymer-homologously chemically modified derivatives, such as cellulose acetates, cellulose propionates and cellulose butyrates, or the cellulose ethers, such as methylcellulose.

Amongst these polymers, groups 1-6, 13 and 16 are preferred, since the stabilisers according to the invention have a particularly pronounced effect in these substrates.

The stabiliser mixtures according to the invention are added to the plastics in an amount of 0.005 to 5% by weight, calculated relative to the material to be stabilised. Preferably 0.01 to 1% by weight and especially 0.02 to 0.5% by weight is used.

The addition to the plastic can be effected by the methods customary for additives for plastics, for example by mixing in powder form or by adding to the plastic melt or to a solution of the plastic or its soluble precursors. The stabilisers can also be added in the form of a master batch which contains the stabilisers, for example in a concentration of 5-25% by weight.

The plastic stabilised in this way can also contain yet further stabilisers or other additives customary in plastics technology, such as those listed, for example, in German Offenlegungsschrift No. 2,349,962 on pages 25-32.

When known stabilisers are additionally used, synergistic effects can arise and this is frequently the case especially when other light stabilisers or organic phosphites are additionally used.

The additional use of antioxidants is of particular importance when stabilizing polyolefins.

The examples which follow illustrate the invention in more detail without restricting it. In the examples parts and percentages are by weight; the temperatures are given in degrees centigrade.

EXAMPLE 1

Preparation of mixtures according to the invention by mixing the components in solution (A) 10.6 g of a polyamine of the formula

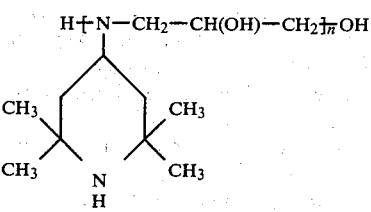

which has been prepared by reacting 4-amino-2,2,6,6-tetramethylpiperidine with 1 mol equivalent of epichlorohydrin in the presence of sodium hydroxide solution and for which a molecular weight of 890 has been determined by gel chromatography, are dissolved in 250 ml of toluene. This solution is mixed with a solution of 8.15 g of nickel oenanthate semihydrate ($_6H_{13}COO)_2Ni.\frac{1}{2} H_2O$ in 100 ml of toluene. The toluene solution is evaporated and the residue is dried in vacuo (11 mm Hg) at 60°. The anhydrous mixture of the two components is obtained in the form of a pale green powder which is soluble in hot ligroin or toluene. According to analysis it contains 8.2% of nickel, which corresponds to a weight ratio of piperidine polymer:metal compound of 56:44, or a content of about 0.5 mol of nickel salt per mol of piperidine radical. (Mixture No. A-1).

The following mixtures were prepared from the same polymer in an analogous manner.

TABLE 1

| Mixture No. | Metal compound | Molar ratio metal:piperidine radical |
|---|---|---|
| A-2 | $(CH_3COO)_2Ni$ | 1:2 |
| A-3 | $(CH_3COO)_2Ni$ | 1:4 |
| A-4 | $(C_6H_{13}COO)_2Zn$ | 1:2 |
| A-5 | $(C_6H_{13}COO)_2Zn$ | 1:4 |
| A-6 | Ni-II acetylacetonate | 1:1 |
| A-7 | Ni-II acetylacetonate | 2:1 |

(B) A polyester of the formula

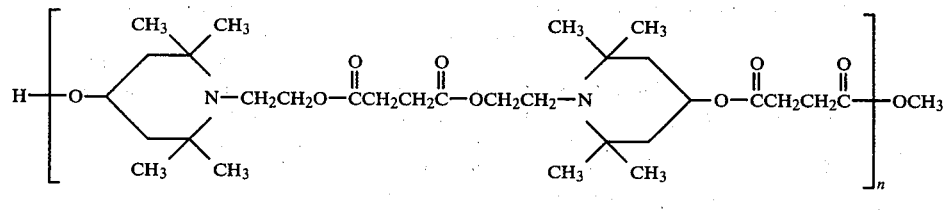

prepared from dimethylsuccinate and 1-β-hydroxyethyl-4-hydroxy-2,2,6,6-tetramethylpiperidine was mixed as described under (A) with the metal compounds listed in Table 2 which follows.

TABLE 2

| Mixture No. | Metal compound | Molar ratio metal:piperidine radical |
|---|---|---|
| B-1 | Ni-II acetylacetonate | 1:2 |
| B-2 | Ni-II acetylacetonate | 1:1 |

(C) A polyester of the formula

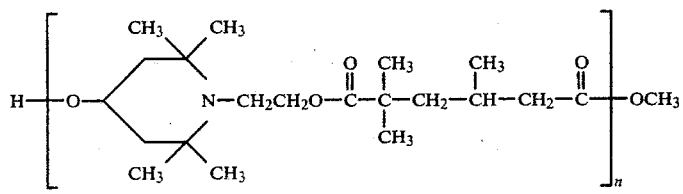

prepared from dimethyl 2,2,4-trimethyladipate and 1-β-hydroxyethyl-4-hydroxy-2,2,6,6-tetramethylpiperidine was mixed with the metal compounds listed in Table 3 which follows, in toluene solution:

TABLE 3

| Mixture No. | Metal compound | Molar ratio metal:piperidine radical |
|---|---|---|
| C-1 | $(C_6H_{13}COO)_2Ni$ | 1:1 |
| C-2 | Ni-II acetylacetonate | 1:1 |

(D) A polyester of the formula

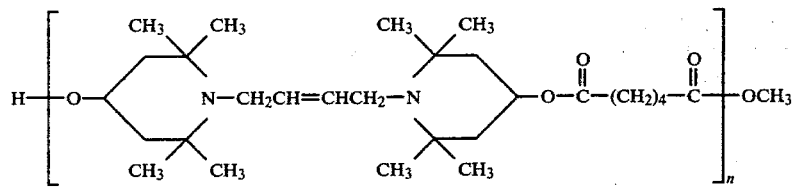

prepared from dimethyladipate and 1,4-bis-(2,2,6,6-tetramethyl-4-hydroxypiperidin-1-yl)-but-2-ene was mixed as described under (A) with the metal compounds listed in Table 4 which follows.

TABLE 4

| Mixture No. | Metal compound | Molar ratio metal:piperidine radical |
|---|---|---|
| D-1 | Ni-II acetylacetonate | 1:2 |
| D-2 | Ni-II acetylacetonate | 1:1 |

(E) A polyaminotriazine of the formula

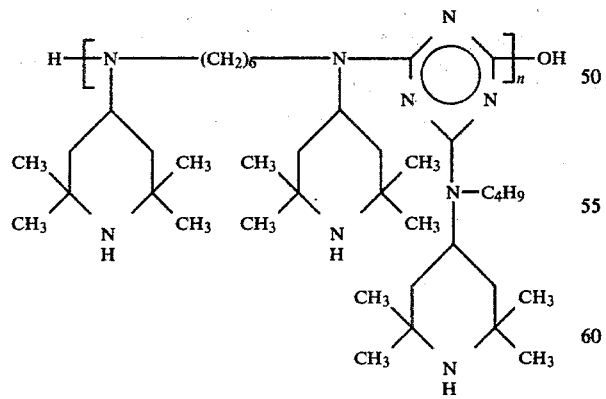

prepared from 1-N-butyl-(2,2,6,6-tetramethylpiperidine-4-amino)-3,5-dichlorotriazine and 1,6-bis-(2,2,6,6-tetramethyl-4-amino)-hexane was mixed with the metal compounds listed in Table 5 which follows, in toluene.

TABLE 5

| Mixture No. | Metal compound | Molar ratio metal:piperidine radical |
|---|---|---|
| E-1 | Ni-II acetylacetonate | 1:3 |
| E-2 | Ni-II acetylacetonate | 2:3 |
| E-3 | $(C_6H_{13}COO)_2Ni$ | 1:3 |

(F) A polyester of the formula

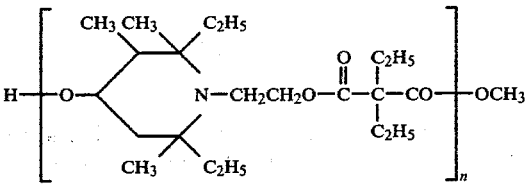

prepared from dimethyl diethylmalonate and 1-hydroxyethyl-2,3,6-trimethyl-2,6-diethyl-4-hydroxypiperidine was mixed with the metal compounds listed in Table 6 which follows, in solution.

TABLE 6

| Mixture No. | Metal compound | Molar ratio metal:piperidine radical | Solvent used |
|---|---|---|---|
| F-1 | Ni-II acetylacetone | 1:1 | toluene |
| F-2 | $(C_6H_{13}COO)_2Ni$ | 1:1 | toluene |
| F-3 | $(CH_3COO)_2Ni$ | 1:1 | ethanol |
| F-4 | $(C_{11}H_{23}COO)_2Ni$ | 1:4 | toluene |
| F-5 | Co-II acetylacetonate | 1:4 | toluene |

(G) A polyacrylate of the formula

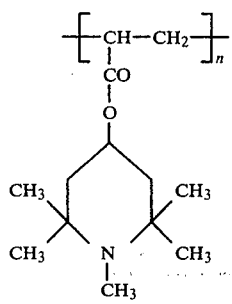

prepared by free radical polymerisation of 1-methyl-2,2,6,6-tetramethyl-4-acryloyloxypiperidine was mixed with the following metal compounds in toluene.

TABLE 7

| Mixture No. | Metal compound | Molar ratio metal:piperidine radical |
|---|---|---|
| G-1 | Ni-II acetylacetonate | 1:1 |
| G-2 | $(C_6H_{13}COO)Ni$ | 1:1 |

In an analogous manner, the following polymeric polyalkylpiperidine compounds were mixed with the metal compounds listed in Table 8, in solution:

(H) A polyester of the formula

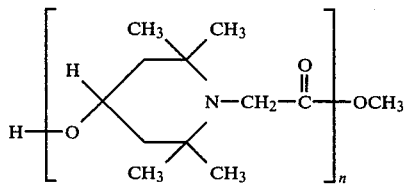

for which a molecular weight within the limits of 800 to 2,000 was determined by gel chromatography. (Table 8: H-1, H-2).

(J) A polyester of the formula

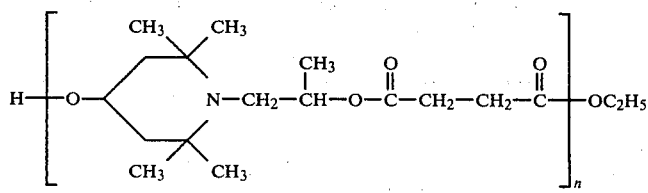

prepared from diethyl succinate and 1-(2'-hydroxypropyl)-4-hydroxy-2,2,6,6-tetramethylpiperidine; average molecular weight about 4,200. (Table 8: J-1, J-2).

(K) A polyester of the formula

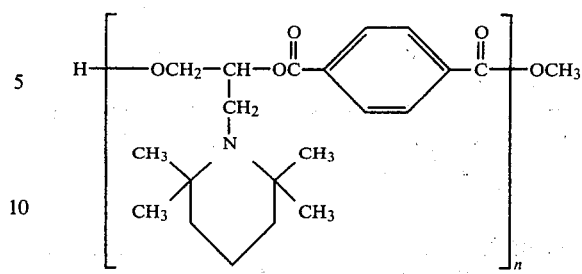

prepared from dimethyl terephthalate and 1-(2',3'-dihydroxypropyl)-2,2,6,6-tetramethylpiperidine; average molecular weight 2,800. (Table 8: K-1)

(L) A polyester of the formula

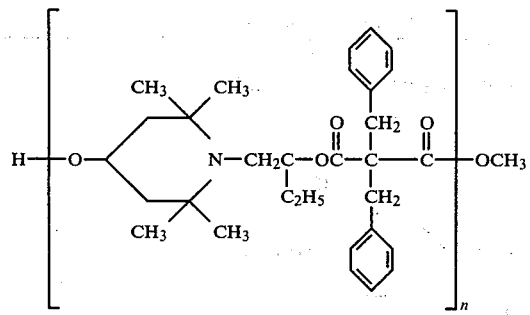

prepared from dimethyl dibenzylmalonate and 1-(2'-hydroxybutyl)-2,2,6,6-tetramethyl-4-hydroxypiperidine; average molecular weight 3,060. (Table 8: L-1, L-2).

(M) A polyester of the formula

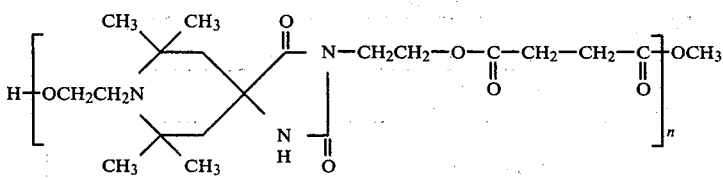

prepared from dimethyl succinate and 3,8-hydroxyethyl-7,7,9,9-tetramethyl-1,3,8-triazaspiro-(4.5)-decane-2,4-dione; average molecular weight 6,300. (Table 8: M-1, M-2).

(N) A polyacrylate of the formula

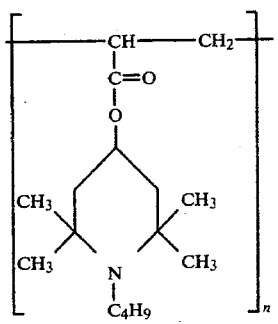

prepared by free radical polymerisation of 1-n-butyl-2,2,6,6-tetramethyl-4-acryloyloxypiperidine; average molecular weight 7,000. (Table 8: N-1).

(O) A polyacrylate of the formula

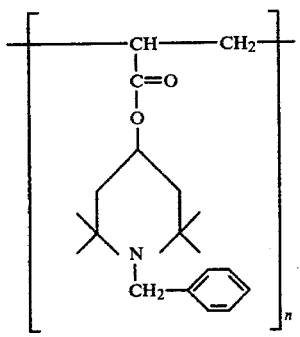

prepared by free radical polymerisation of 1-benzyl-2,2,6,6-tetramethyl-4-acryloyloxypiperidine; average molecular weight 9,100. (Table 8: O-1).

(P) A polyacrylate of the formula

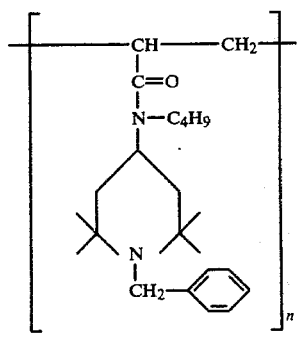

prepared by free radical polymerisation of 1-benzyl-2,2,6,6-tetramethyl-4-acryloyl-butylamidopiperidine; average molecular weight 12,600. (Table 8: P-1).

(Q) A polyacrylate of the formula

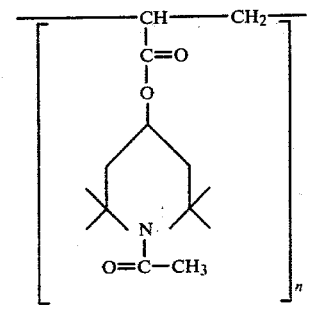

prepared by free radical polymerisation of 1-acetyl-2,2,6,6-tetramethyl-4-acryloyloxypiperidine; average molecular weight 6,000. (Table 8: Q-1, Q-2).

(R) A polyacrylate of the formula

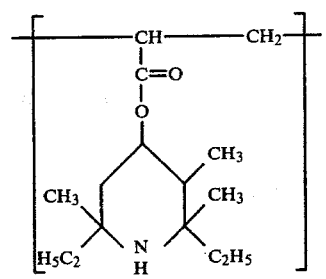

prepared by free radical polymerisation of 2,3,6-trimethyl-2,6-diethyl-4-acryloyloxypiperidine; average molecular weight 10,100. (Table 8: R-1).

(S) A polyamine of the formula

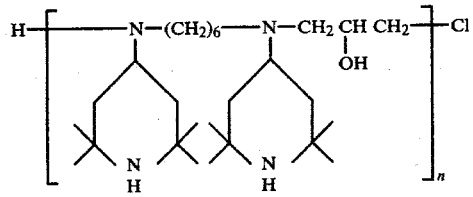

prepared by reacting one mole of N,N'-bis-(2,2,6,6-tetramethylpiperidin-4-yl)-hexamethylenediamine with one mol of epichlorohydrin; average molecular weight 2,200. (Table 8: S-1, S-2, S-3).

(T) A polyamine of the formula

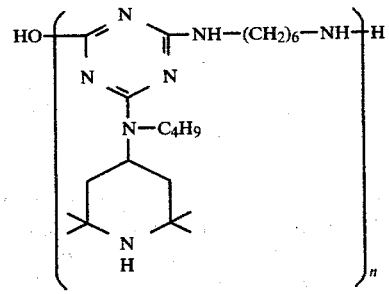

prepared by reacting one mol of N,N'-bis-[2-chloro-4-butyl-(2',2',6',6'-tetramethylpiperidin-4'-yl)-amino-1,3,5-triazin-6-yl]-hexamethylenediamine with one mol of hexamethylenediamine; average molecular weight 3,260. (Table 8: T-1, T-2).

(U) A polyamide of the formula

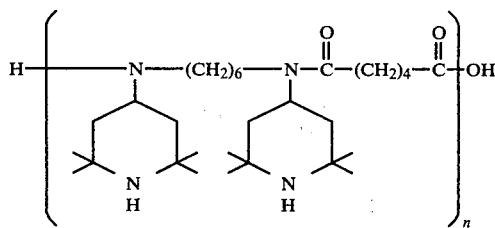

prepared by reacting one mol of N,N'-bis-(2,2,6,6-tetramethylpiperidin-4-yl)-hexamethylenediamine with one mol of adipic acid chloride; average molecular weight 3,600. (Table 8: U-1, U-2).

(V) A polyamide of the formula

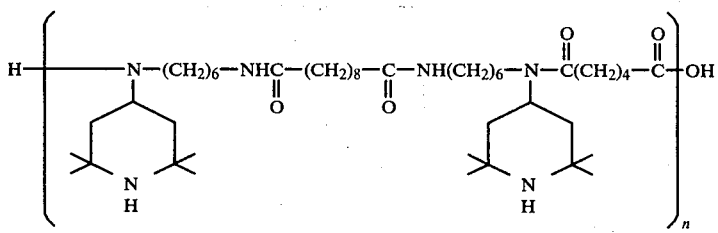

prepared by a polycondensation reaction of one mol of N,N'-bis-[6-(2,2,6,6-tetramethylpiperidin-4-yl)-aminohexyl]-sebacic acid amide with one mol of adipic acid chloride. (Table 8: V-1, V-2).

(W) A polyurea of the formula

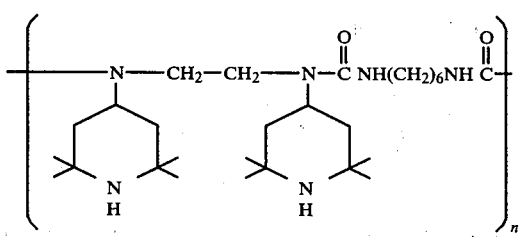

prepared by reacting one mol of N,N'-bis-(2,2,6,6-tetramethylpiperidin-4-yl)-ethylenediamine with one mol of hexamethylene diisocyanate; average molecular weight 4,100. (Table 8: W-1, W-2).

(X) A polycarbonate of the formula

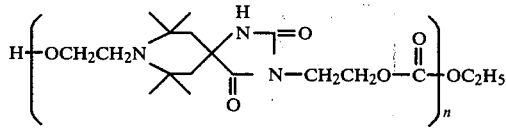

prepared by reacting one mol of 3,8-di-(2'-ethoxycarbonyloxyethyl)-7,7,9,9-tetramethyl-1,3,8-triazaspiro-(4,5)-decane-2,4-dione with one mol of 3,8-di(2'-hydroxyethyl)-7,7,9,9-tetramethyl-1,3,8-triazaspiro-(4,5)-decane-2,4-dione; average molecular weight 4,600. (Table 8: X-1, X-2).

(Y) A copolymer of vinylcarbonitrile and 1,2,2,6,6-pentamethyl-4-acryloyloxypiperidine in a molar ratio of 1:1; average molecular weight 29,000. (Table 8: Y-1).

TABLE 8

| Mixture No. | Metal compound | Molar ratio metal: piperidine residue | Solvent used |
|---|---|---|---|
| H-1 | $(C_6H_{13}COO)_2Ni$ | 1 : 1 | toluene |
| H-2 | Ni-II acetylacetonate | 1 : 1 | ethanol |
| J-1 | Ni-II acetylacetonate | 1 : 2 | ethanol |
| J-2 | $(C_{11}H_{23}COO)_2Ni$ | 1 : 2 | toluene |
| K-1 | Ni-II actylacetonate | 1 : 2 | ethanol/ toluene (1:1) |
| L-1 | Ni-II acetylacetonate | 1 : 2 | ethanol/ toluene (1:1) |
| L-2 | 1:2 Ni-II chelate of 2-benzoyl-5-n-octyl-oxyphenol | 1 : 2 | |
| M-1 | Ni-II acetylacetonate | 1 : 2 | ethanol/ chloroform (1 : 4) |
| M-2 | 1:2 Ni-II chelate of 1,2,2,6,6-pentamethyl-4-(1',3'-dioxobutyl-oxy)-piperidine enolate | 1 : 2 | chloroform |
| N-1 | Ni-II acetylacetonate | 1 : 2 | ethanol/ toluene (1:1) |
| O-1 | Ni-II acetylacetonate | 1 : 2 | ethanol/ toluene (1:3) |
| P-1 | Ni-II acetylacetonate | 1 : 2 | ethanol/ toluene (1:1) |
| Q-1 | Ni-II acetylacetonate | 1 : 1 | ethanol/ toluene (1:3) |
| Q-2 | 1:2 Ni-II chelate of 1,2,2,6,6-pentamethyl-4-[N-heptyl-N-(1',3'-dioxo-butyl)]-amino-piperidine enolate | 1 : 1 | toluene |
| R-1 | 1:2 Ni-II chelate of 1-phenyl-3-methyl-4-decanoyl-pyrazolone enolate | 1 : 2 | toluene |
| S-1 | Ni-II acetylacetonate | 1 : 2 | ethanol |
| S-2 | $(C_6H_{13}COO)_2Ni$ | 1 : 2 | toluene |
| S-3 | 1:2 Ni-II chelate of pentyl 3-oxo-butanoate | 1 : 2 | toluene |
| T-1 | Ni-II acetylacetonate | 1 : 2 | ethanol |
| T-2 | $(C_{11}H_{23}COO)_2Ni$ | 1 : 2 | toluene |
| U-1 | Ni-II acetylacetonate | 1 : 2 | ethanol |
| U-2 | $(C_6H_{13}COO)_2Ni$ | 1 : 2 | toluene |
| V-1 | Ni-II acetylacetonate | 1 : 2 | ethanol |
| V-2 | $(C_{11}H_{23}COO)_2Ni$ | 1 : 2 | toluene |
| W-1 | Ni-II acetylacetonate | 1 : 4 | ethanol |
| W-2 | $(C_{11}H_{23}COO)_2Ni$ | 1 : 4 | toluene |
| X-1 | Ni-II acetylacetonate | 1 : 2 | chloroform/ ethanol (3:1) |
| X-2 | $(C_{11}H_{23}COO)_2Ni$ | 1 : 2 | chloroform/ toluene (4:1) |
| Y-1 | Ni-II acetylacetonate | 1 : 2 | ethanol/ toluene (1:3) |

EXAMPLE 2

Light stabilising of polypropylene tapes 100 parts of polypropylene powder (melt index 1.5 g/10 minutes, 230° C., 2,160 g load) were mixed in a drum mixer with 0.1 part of pentaerythritol tetrakis-[3-(3',5'-ditertiary butyl-4-hydroxyphenyl)-propionate] and 0.15 part of the light stabilisers listed in the table which follows, in the indicated concentrations, and the mixture was extruded in an extruder at 200°-220° C. and granulated. The resulting granules were processed in the conventional manner by means of an extruder with a sheet die to give films, which were cut into tapes, which were then stretched to six times their length at elevated temperature. The gauge of these tapes was 700-900 denier, their width was 4 mm and their tear strength was 5.5-6.5 g/denier. These tapes were exposed in a Xenotest 1200. At regular intervals samples were subjected to a stress-elongation test and a progressive fall in the tear strength results as the exposure time increases. The exposure time which elapses before the tear strength has fallen to half of its initial value is lengthened by the action of the light stabilisers.

TABLE 9

| Light stabiliser | Exposure time which elapses before the tear strength has fallen by 50% |
|---|---|
| none | 480 hours |
| A-1 | 4,820 hours |
| A-2 | 5,980 hours |
| A-3 | 5,700 hours |
| A-4 | 3,920 hours |
| A-5 | 5,960 hours |
| A-6 | 5,000 hours |
| A-7 | 4,560 hours |
| B-1 | 1,530 hours |
| B-2 | 1,430 hours |
| C-1 | 1,120 hours |
| G-1 | 1,200 hours |
| G-2 | 1,320 hours |

What is claimed is:

1. A stabiliser mixture of (a) a linear polymer which contains polyalkylpiperidine residues chemically bonded in any form and (b) a metal compound of the formula $MeL_2$, in which Me is nickel or cobalt, L is an enolate ion of the formula

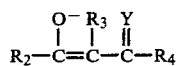

in which Y is oxo or $NR_6$ wherein $R_6$ is $C_1-C_{12}$ alkyl, cyclohexyl, benzyl, phenyl, naphthyl or tolyl, $R_2$ is $C_1-C_{12}$ alkyl or phenyl and $R_3$ is hydrogen or $R_2$ and $R_3$ together are 1,4-butadienylene or 1,4-butadienylene substituted by alkyl of 1-4 carbon atoms and $R_4$ is $C_1-C_{12}$ alkyl or $C_1-C_{12}$ alkoxy, the weight ratio of component (a) to component (b) being 99.9:0.1 to 10:90.

2. A stabiliser mixture according to claim 1, wherein component (a) consists of a linear polymer, the recurring structural unit of which contains at least one polyalkylpiperidine residue of the formula I or II

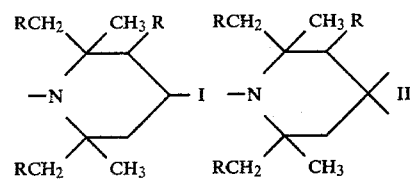

or is substituted by a polyalkylpiperidine side group of the formula III, IV or V

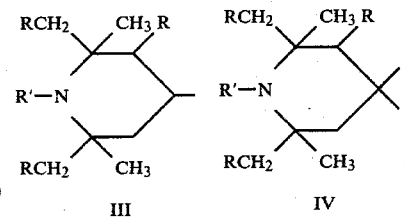

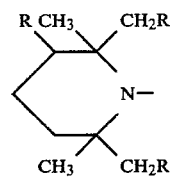

in which R is hydrogen or $C_1-C_5$ alkyl and R' is hydrogen, $C_1-C_{18}$ alkyl, $C_3-C_8$ alkenyl, $C_3-C_8$ alkynyl, $C_7-C_{12}$ aralkyl, $C_1-C_8$ alkanoyl or $C_3-C_5$ alkenoyl, or a copolymer thereof.

3. A mixture according to claim 1, wherein component (a) is a polyester, polyether or polyurea or a polyamide, polyurethane, polyamine or polyaminotriazine, which contain polyalkylpiperidine residues of the formulae I-V as defined in claim 2.

4. A mixture according to claim 1, wherein component (a) is a poly(meth)acrylate or a poly(meth)acrylamide, which contains polyalkylpiperidine residues of the formula III-V as defined in claim 2.

5. A mixture according to claim 2 wherein component (a) contains, in its recurring structural unit, a polyalkylpiperidine residue of one of the formulae VII to XXVI

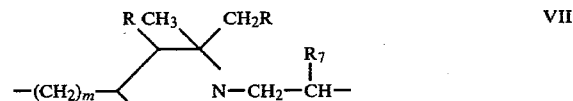

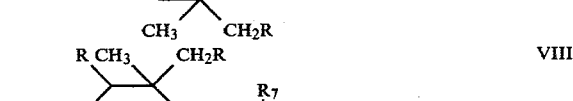

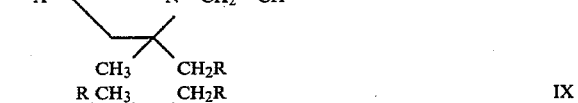

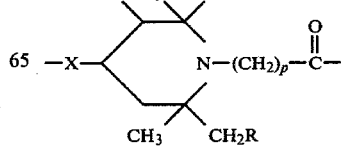

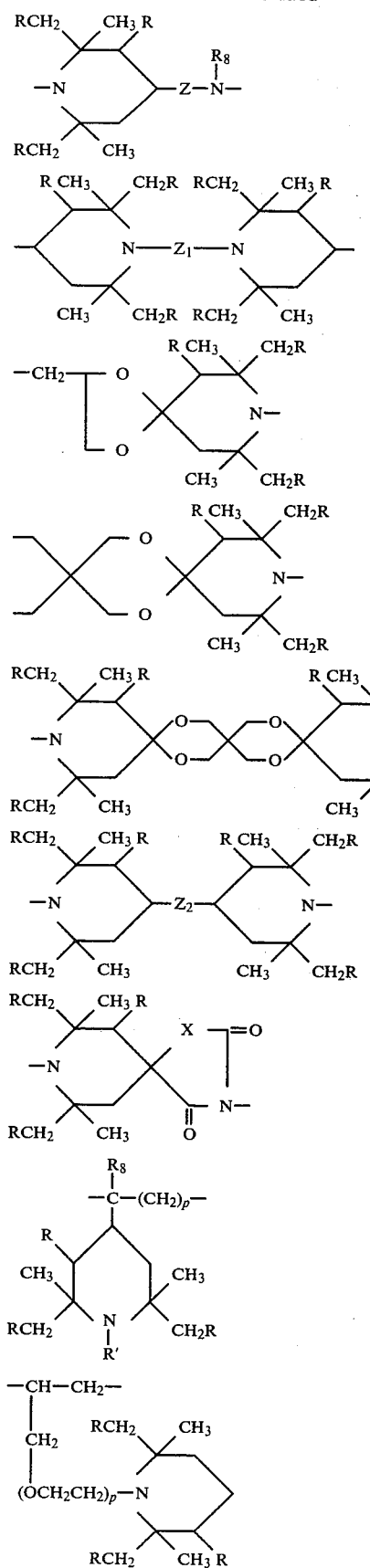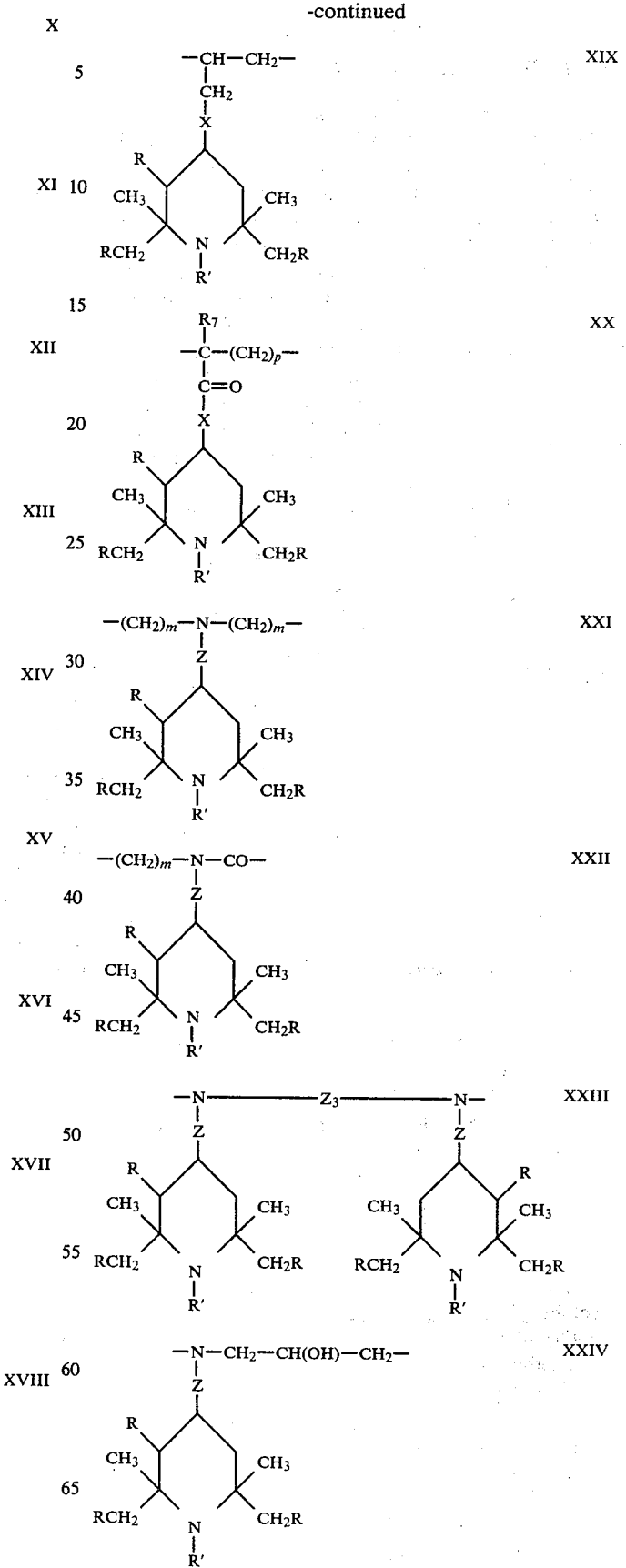

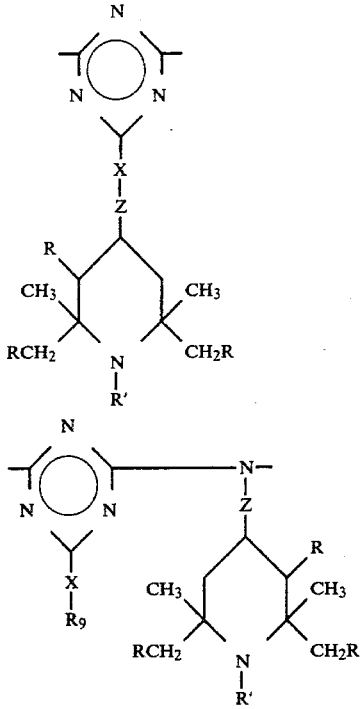

XXV

XXVI in which R and R' are as defined in claim 2, m is 1, 2 or 3, p is zero or 1, $R_7$ is hydrogen, methyl or phenyl, X is oxygen or $NR_8$, $R_8$ and $R_9$ independently of one another are hydrogen, $C_1$-$C_{18}$ alkyl, $C_5$-$C_{12}$ cycloalkyl, $C_7$-$C_{11}$ aralkyl or phenyl, Z is a direct bond or a group of the formula —$CH_2CH_2$— or —$OCH_2CH_2CH_2$—, $Z_1$ is $C_4$-$C_8$ alkylene, $C_4$-$C_8$ alkenylene or p-xylylene, $Z_2$ is $C_4$-$C_{10}$ alkylene, p-xylylene,

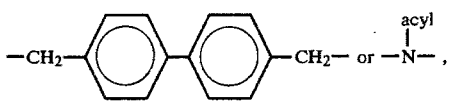

in which acyl is $C_2$-$C_8$ alkanoyl or $C_3$-$C_5$ alkenoyl, and $Z_3$ is $C_2$-$C_{12}$ alkylene, $C_6$-$C_{12}$ arylene, 4,4'-dicyclohexylenemethane or a radical of the formula phenylene-$Z_4$-phenylene wherein $Z_4$ is —$CH_2$—, >$C(CH_3)_2$, —O— or —$SO_2$—.

6. A mixture according to claim 2, wherein component (a) contains, in its recurring structural unit, a polyalkylpiperidine residue of one of the formulae I-V, in which R is hydrogen or methyl.

7. A mixture according to claim 6, in which R is hydrogen.

8. A mixture according to claim 5, wherein component (a) contains, in its recurring structural unit, a polyalkylpiperidine residue of one of the formulae VII to XXVI, in which R is hydrogen or methyl.

9. A mixture according to claim 8, in which R is hydrogen.

10. A mixture according to claim 1, wherein component (a) is a copolymer of a polyalkylpiperidine-containing component and a polyalkylpiperidine-free component.

11. A mixture according to claim 2, wherein component (a) contains, in its recurring structural unit, a polyalkylpiperidine residue of the formulae III or IV, in which R' is hydrogen or methyl.

12. A mixture according to claim 5, wherein component (a) contains, in its recurring structural unit, a polyalkylpiperidine residue of one of the formulae XVII or XIX to XXVI in which R' is hydrogen or methyl.

13. A mixture according to claim 1, wherein Y is oxo.

14. A mixture according to claim 1, wherein the ligand L is the anion of acetylacetone.

15. A stabiliser mixture according to claim 5, wherein component (a) is a polyester, the recurring structural unit of which contains a polyalkylpiperidine residue of the formulae VIII, IX, XXI or XXIII, in which m is 1 or 2, R and R' are hydrogen or methyl and p, $R_7$, X, Z and $Z_3$ are as defined in claim 5.

16. A mixture according to claim 5, wherein component (a) is a polyamide, the recurring structural unit of which contains a residue of the formulae XV, XXI or XXIII, in which R and R' are hydrogen or methyl and m, Z, $Z_2$ and $Z_3$ are as defined in claim 5.

17. A mixture according to claim 5, wherein component (a) is a polyaminotriazine, the recurring structural unit of which contains a radical of the formulae X, XXIII, XXV or XXVI, in which X is $NR_8$, Z is a direct bond, R and R' are hydrogen or methyl and $R_8$, $R_9$ and $Z_3$ are as defined in claim 5.

18. A mixture according to claim 5, wherein component (a) is a polyamine, the recurring structural unit of which contains a radical of the formulae XXIII or XXIV, in which Z is a direct bond, R and R' are hydrogen or methyl and $Z_3$ is as defined in claim 5.

19. A mixture according to claim 5, wherein component (a) is a polyacrylate or polymethacrylate, the recurring structural unit of which contains a radical of the formula XX, in which $R_7$ is hydrogen, X is oxygen, p is 1 and R and R' are hydrogen or methyl.

20. A mixture according to claim 2, wherein component (a) is a copolymer of an acrylate or methacrylate, which contains a polyalkylpiperidine residue in the ester radical, and an ethylenically unsaturated monomer, which does not contain a piperidine radical.

21. A mixture according to claim 20, in which the ethylenically unsaturated monomer which does not contain a piperidine radical is an acrylate or methacrylate.

22. A mixture according to claim 1, wherein the weight ratio of the components a:b is 95:5 to 60:40.

23. A plastic stabilised against the action of light, which contains 0.01 to 5% by weight, calculated relative to the plastic to be stabilised, of a stabiliser mixture according to claim 1.

* * * * *